US012654324B2

(12) United States Patent
Ogawa et al.

(10) Patent No.: US 12,654,324 B2
(45) Date of Patent: *Jun. 16, 2026

(54) CONTROL DEVICE, CONTROL METHOD AND STORAGE MEDIUM

(71) Applicant: NEC Corporation, Tokyo (JP)

(72) Inventors: Masatsugu Ogawa, Tokyo (JP); Hisaya Wakayame, Tokyo (JP); Takehiro Itou, Tokyo (JP); Mineto Satoh, Tokyo (JP); Hiroyuki Oyama, Tokyo (JP); Nobuharu Kami, Tokyo (JP)

(73) Assignee: NEC CORPORATION, Tokyo (JP)

( * ) Notice: Subject to any disclaimer, the term of this patent is extended or adjusted under 35 U.S.C. 154(b) by 335 days.

This patent is subject to a terminal disclaimer.

(21) Appl. No.: 17/799,714

(22) PCT Filed: Feb. 25, 2020

(86) PCT No.: PCT/JP2020/007446
§ 371 (c)(1),
(2) Date: Aug. 15, 2022

(87) PCT Pub. No.: WO2021/171357
PCT Pub. Date: Sep. 2, 2021

(65) Prior Publication Data
US 2023/0069393 A1    Mar. 2, 2023

(51) Int. Cl.
| | |
|---|---|
| *B25J 9/16* | (2006.01) |
| *B25J 13/08* | (2006.01) |
| *G05B 19/4155* | (2006.01) |

(52) U.S. Cl.
CPC ............. *B25J 9/1674* (2013.01); *B25J 13/08* (2013.01); *G05B 19/4155* (2013.01); *G05B 2219/50391* (2013.01)

(58) Field of Classification Search
CPC ........ B25J 9/1674; B25J 13/08; B25J 9/1661; G05B 19/4155; G05B 2219/50391;
(Continued)

(56) References Cited

U.S. PATENT DOCUMENTS

| 10,471,597 | B1 * | 11/2019 | Murphy | ................. | B25J 9/1674 |
| 2009/0281659 | A1 * | 11/2009 | Wappling | ............... | B25J 9/1674 |
| | | | | | 700/245 |

(Continued)

FOREIGN PATENT DOCUMENTS

| JP | 2011-227773 A | 11/2011 |
| JP | 2017-039170 A | 2/2017 |

(Continued)

OTHER PUBLICATIONS

International Search Report for PCT Application No. PCT/JP2020/007446, mailed on Apr. 7, 2020.
(Continued)

*Primary Examiner* — Sihar A Karwan
(74) *Attorney, Agent, or Firm* — Sughrue Mion, PLLC

(57) ABSTRACT

A control device 1C mainly includes an operation sequence generation means 16C and a synchronization management means 17C. The operation sequence generation means 16C is configured to generate, based on an operation prediction result R2a of another working body which performs cooperative work with a robot which executes a task, an operation sequence Sra to be executed by the robot. The synchronization management means 17C is configured to synchronize an operation executed by the robot during execution of the operation sequence Sra and an operation executed by the other working body.

8 Claims, 14 Drawing Sheets

(58) Field of Classification Search
CPC .......... G05B 2219/39091; G05B 2219/40202; G05B 2219/40607
See application file for complete search history.

(56) References Cited

U.S. PATENT DOCUMENTS

| | | | | |
|---|---|---|---|---|
| 2014/0074291 | A1* | 3/2014 | Emoto | B25J 9/1697 |
| | | | | 700/258 |
| 2015/0375398 | A1* | 12/2015 | Penn | G05D 1/0027 |
| | | | | 700/218 |
| 2018/0085922 | A1* | 3/2018 | Ooba | B25J 9/1679 |
| 2018/0157260 | A1* | 6/2018 | Hayama | G05D 1/02 |
| 2019/0038439 | A1* | 2/2019 | Caspers | A61F 2/7812 |
| 2019/0070725 | A1* | 3/2019 | Buerger | G05B 19/0426 |
| 2019/0275676 | A1* | 9/2019 | Jensen | B25J 13/006 |
| 2019/0351542 | A1* | 11/2019 | Buerger | B25J 9/0084 |
| 2019/0384309 | A1 | 12/2019 | Silva et al. | |
| 2020/0086487 | A1* | 3/2020 | Johnson | B25J 9/1664 |
| 2020/0103857 | A1* | 4/2020 | Wynne | G05B 19/4099 |
| 2020/0282549 | A1* | 9/2020 | Torii | B25J 9/1661 |
| 2020/0306974 | A1* | 10/2020 | Fattey | B25J 9/161 |
| 2021/0146546 | A1* | 5/2021 | Linkowski | B25J 9/1676 |
| 2022/0212346 | A1* | 7/2022 | Toritani | B25J 9/1661 |
| 2023/0080565 | A1* | 3/2023 | Ogawa | B25J 9/163 |
| | | | | 700/245 |
| 2023/0104802 | A1* | 4/2023 | Oyama | B25J 9/1661 |
| | | | | 700/246 |
| 2023/0321827 | A1* | 10/2023 | Ogawa | B25J 9/1674 |
| 2023/0356389 | A1* | 11/2023 | Ichien | B25J 9/1656 |
| 2023/0364786 | A1* | 11/2023 | Oyama | G05D 1/02 |
| 2024/0131711 | A1* | 4/2024 | Itou | B25J 9/1671 |
| 2024/0208047 | A1* | 6/2024 | Itou | B25J 13/08 |
| 2024/0253223 | A1* | 8/2024 | Satoh | B25J 9/1666 |

FOREIGN PATENT DOCUMENTS

| | | | |
|---|---|---|---|
| JP | 2018-051684 | A | 4/2018 |
| JP | 2019-003510 | A | 1/2019 |
| JP | 2019-200792 | A | 11/2019 |

OTHER PUBLICATIONS

JP Office Action for JP Application No. 2022-502362, mailed on Sep. 5, 2023 with English Translation.

* cited by examiner

100: ROBOT CONTROL SYSTEM

100A : ROBOT CONTROL SYSTEM

CONTROL DEVICE, CONTROL METHOD AND STORAGE MEDIUM

This application is a National Stage Entry of PCT/JP2020/007446 filed on Feb. 25, 2020, the contents of all of which are incorporated herein by reference, in their entirety.

TECHNICAL FIELD

The present invention relates to a technical field of a control device, a control method, and a storage medium for performing process related to tasks to be executed by a robot.

BACKGROUND ART

There is proposed such a control method to perform control of a robot necessary for executing the task when a task to be performed by a robot is given. For example, Patent Literature 1 discloses a robot controller configured, when placing a plurality of objects in a container by a robot with a hand for gripping an object, to determine possible orders of gripping the objects by the hand and to determine the order of the objects to be placed in the container based on the index calculated with respect to each of the possible orders.

CITATION LIST

Patent Literature

Patent Literature 1: JP 2018-51684A

SUMMARY

Problem to be Solved

When a robot performs a task, depending on the given task, it is necessary for the robot to perform the work in a common workspace with other robots or other workers. Patent Literature 1 is silent on the control of the robot to be required when the robot performs such cooperative work.

One object of the present invention is to provide a control device, a control method, and a storage medium capable of causing a robot to suitably perform cooperative work with another working body in view of the issues described above.

Means for Solving the Problem

In one mode of the control device, there is provided a control device including: an operation sequence generation means configured to generate, based on an operation prediction result of another working body which performs cooperative work with a robot which executes a task, an operation sequence to be executed by the robot; and a synchronization management means configured to synchronize an operation executed by the robot during execution of the operation sequence and an operation executed by the other working body.

In one mode of the control method, there is provided a control method executed by a computer, the control method including: generating, based on an operation prediction result of another working body which performs cooperative work with a robot which executes a task, an operation sequence to be executed by the robot; and synchronizing an operation executed by the robot during execution of the operation sequence and an operation executed by the other working body.

In one mode of the storage medium, there is provided a storage medium storing a program executed by a computer, the program causing the computer to function as: an operation sequence generation means configured to generate, based on an operation prediction result of another working body which performs cooperative work with a robot which executes a task, an operation sequence to be executed by the robot; and a synchronization management means configured to synchronize an operation executed by the robot during execution of the operation sequence and an operation executed by the other working body.

Effect

An example advantage according to the present invention is to cause a robot to suitably perform cooperative work with another working body.

EXAMPLE EMBODIMENTS

Hereinafter, an example embodiment of a control device, a control method, and a storage medium will be described with reference to the drawings.

First Example Embodiment (1) System Configuration

Figure 1:
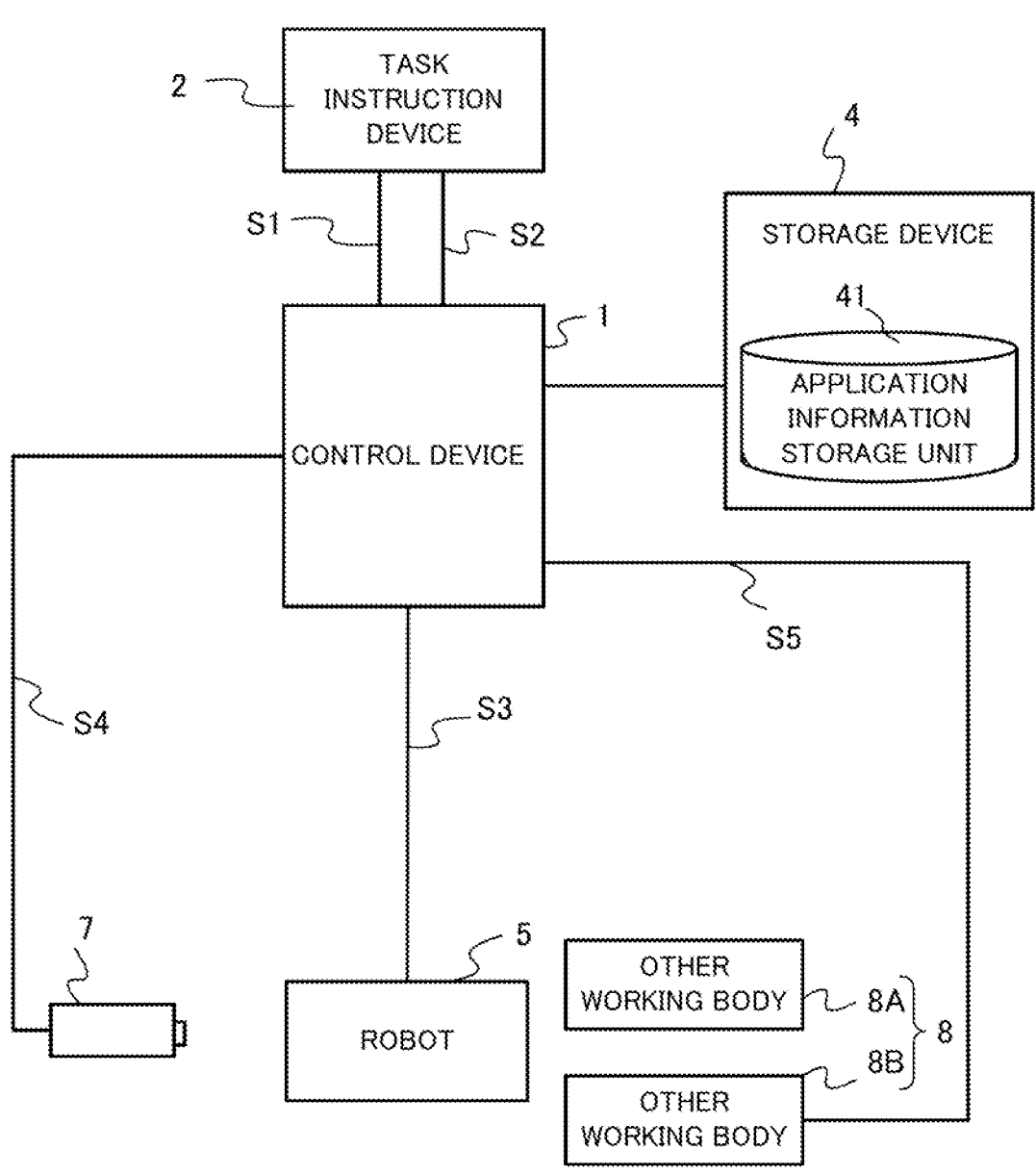
FIG. 1 shows a configuration of a robot control system in the first example embodiment.

FIG. 1 shows a configuration of a robot control system 100 according to the first example embodiment. The robot control system 100 mainly includes a control device 1, a task instruction device 2, a storage device 4, a robot 5, and a measurement device 7.

When a task (also referred to as "objective task") to be performed by the robot 5 is specified, the information processing device 1 converts the objective task into a time step sequence of simple tasks each of which the robot 5 can accept, and controls the robot 5 based on the sequence. Hereafter, a simple task in units of command that can be accepted by the robot 5 is also referred to as "subtask" and a sequence of subtasks to be executed by each of the robots 5 in order to achieve the objective task is referred to as "subtask sequence". The subtask sequence corresponds to an operation (motion) sequence which defines a series of operations to be executed by the robot 5.

The control device 1 performs data communication with the task instruction device 2, the storage device 4, the robot 5, the measurement device 7, and at least one of the other working bodies 8 through a communication network or by direct communication. For example, the control device 1 receives an input signal "S1" specifying the objective task from the task instruction device 2. Further, the control device 1 transmits a display signal "S2" for displaying information relating to a task to be executed by the robot 5 to the task instruction device 2. Further, the control device 1 transmits a control signal "S3" for operating the robot 5 to the robot 5. Further, the control device 1 receives the output signal "S4" from the measurement device 7.

The task instruction device 2 is a device configured to accept input of an objective task from a user. The task instruction device 2 displays information based on the display signal S2 supplied from the control device 1, or supplies the input signal S1 generated based on the input from the user to the control device 1. The task instruction device 2 may be a tablet terminal equipped with an input unit and a display unit, or may be a stationary personal computer, or may be a remote controller equipped with a display.

The storage device 4 includes an application information storage unit 41. The application information storage unit 41 stores application information necessary for generating a subtask sequence from the objective task. Details of the application information will be described later with reference to FIG. 3. The storage device 4 may be an external storage device such as a hard disk connected to or built in to the control device 1, or may be a storage medium such as a flash memory. The storage device 4 may be a server device that performs data communication with the control device 1 through a communication network. In this case, the storage device 4 may be configured by a plurality of server devices.

The robot 5 performs, based on the control signal S3 supplied from the control device 1, cooperative work with the other working bodies 8. The robot 5 may be any type of robot such as a vertical articulated robot and a horizontal articulated robot. The robot 5 may supply a state signal indicating the state of the robot 5 to the control device 1. The state signal may be an output signal from a sensor for detecting a state (such as position and angle) of the entire robot 5 or specific portions thereof such as joints of the robot 5, or may be a signal, which is generated by a control unit of the robot 5, indicating the progress of subtasks to be executed by the robot 5.

The measurement device 7 is one or more sensors configured to detect the state within the workspace in which the objective task is performed and examples of the measurement device 7 include a camera, a range finder sensor, a sonar, and a combination thereof. The measurement device 7 supplies the generated output signal S4 to the control device 1. The output signal S4 may be image data taken in the workspace, or may be a point cloud data indicating the positions of objects present in the workspace. The measurement device 7 may be a self-propelled sensor or a flying sensor (including a drone) that moves within the workspace. The measurement device 7 may also include a sensor provided in the robot 5, and a sensor provided in the other working bodies 8. The measurement device 7 may also include a sensor configured to detect sounds in the workspace. Thus, the measurement device 7 may include various sensors configured to detect a state in the workspace and may be provided at any place.

The other working bodies 8 (8A, 8B, . . . ) each is a worker, a robot or a machine tool configured to perform an operation related to the objective task, and performs cooperative work with the robot 5 in the workspace. Further, at least one (the other working body 8B in FIG. 1) of the other working bodies 8 generates other working body operation related information "S5" which is information on the operation executed by the other working body 8 of interest, and transmits the generated other working body operation related information S5 to the control device 1. The other working body operation related information S5 may include, for example, information indicating the progress of the task such as information indicating the timing at which the task currently being executed by the other working body 8 will be completed, or information on the number of tasks that can be executed per specified unit time.

It is noted that a marker or a sensor for performing the operation recognition (e.g., motion capture) of the other working body 8 may be provided at the other working body 8. In this case, the above-described marker or sensor is provided at one or more feature points that are characteristic points in the recognition of the operation executed by the other working body 8 such as joints and hands of the other working body 8. Examples of the measurement device 7 include a sensor configured to detect the position of a marker of a feature point and a sensor provided at a feature point.

The configuration of the robot control system 100 shown in FIG. 1 is an example, and various changes may be applied to the configuration. For example, there may be plural robots 5 or the robot 5 may be equipped with plural targets of control which operate independently such as robot arms. Even in these cases, the control device 1 generates a subtask sequence to be executed for each robot 5 or for each target of control based on the objective task, and transmits the control signal S3 based on the subtask sequence to the robot 5. Further, the other working bodies 8 may include only one or three or more other working bodies. The measurement device 7 may be a part of the robot 5. Further, the task instruction device 2 may be configured as the same device as the control device 1. Further, the control device 1 may be configured by a plurality of devices. In this case, the plurality of devices functioning as the control device 1 exchange information necessary to execute the pre-allocated process among the devices. Further, the robot 5 may incorporate all or at least a part of the functions of the control device 1.

(2) Hardware Configuration

Figures 2A, 2B:
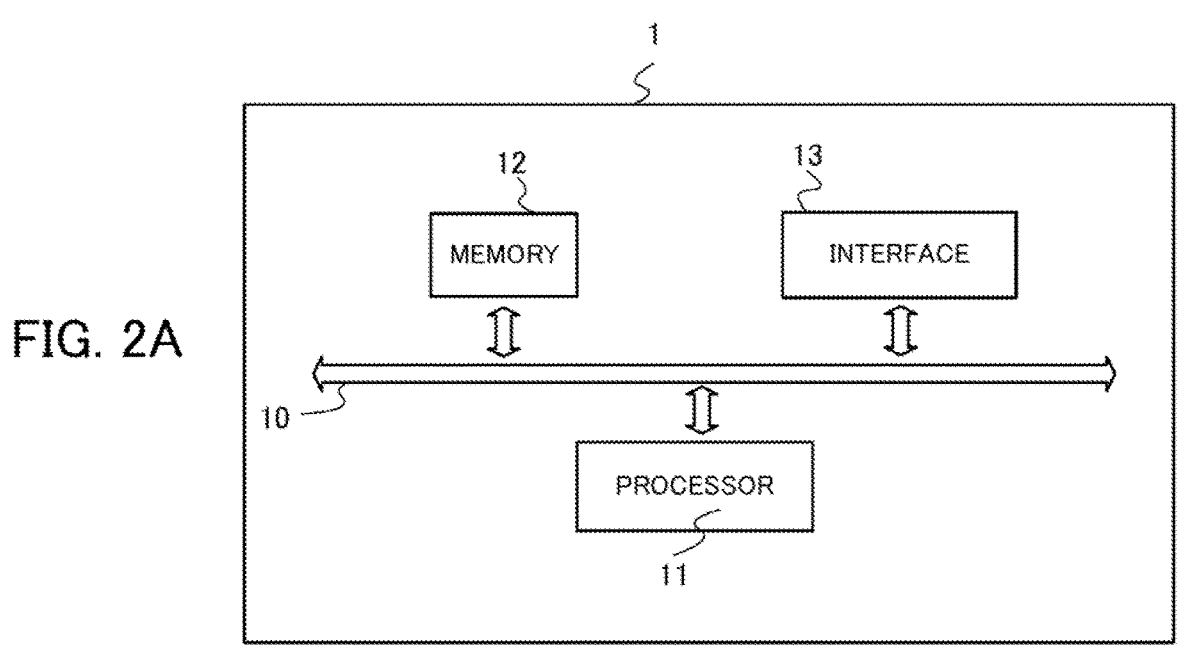
FIG. 2 illustrates a hardware configuration of a control device.

FIG. 2A shows a hardware configuration of the control device 1. The control device 1 includes, as hardware, a processor 11, a memory 12, and an interface 13. The processor 11, the memory 12, and the interface 13 are connected via a data bus 10 to one another.

The processor 11 executes a predetermined process by executing a program stored in the memory 12. The processor 11 is one or more processors such as a CPU (Central Processing Unit) and a GPU (Graphics Processing Unit).

The memory 12 is configured by various volatile and non-volatile memories such as a RAM (Random Access Memory) and a ROM (Read Only Memory). Further, the memory 12 stores a program for the control device 1 to execute a predetermined process. The memory 12 is used as a work memory and temporarily stores information acquired from the storage device 4. The memory 12 may function as a storage device 4. In contrasts, the storage device 4 may function as the memory 12 of the control device 1. The program executed by the control device 1 may be stored in a storage medium other than the memory 12.

The interface 13 is an interface for electrically connecting the control device 1 to other external devices. For example, the interface 13 includes an interface for connecting the control device 1 to the task instruction device 2, and an interface for connecting the control device 1 to the storage device 4. The interface 13 includes an interface for connecting the control device 1 to the robot 5, and an interface for connecting the control device 1 to the measurement device 7. These connections may be wired connections or may be wireless connections. For example, the interface for connecting the control device 1 to these external devices may be a communication interface for wired or wireless transmission and reception of data to and from these external devices under the control of the processor 11. In another example, the control device 1 and the external devices may be connected by a cable or the like. In this case, the interface 13 includes an interface which conforms to an USB (Universal Serial Bus), a SATA (Serial AT Attachment), or the like for exchanging data with the external devices.

The hardware configuration of the control device 1 is not limited to the configuration shown in FIG. 2A. For example, the control device 1 may be connected to or incorporate a display device, an input device, or sound output device. Further, the control device 1 may include at least one of the task instruction device 2 or the storage device 4.

FIG. 2B shows a hardware configuration of the task instruction device 2. The task instruction device 2 includes, as hardware, a processor 21, a memory 22, an interface 23, an input unit 24, and a display unit 25. The processor 21, the memory 22, and the interface 23 are connected via a data bus 29 to one another. Further, the input unit 24 and the display unit 25 is connected to the interface 23.

The processor 21 executes predetermined processing by executing a program stored in the memory 22. The processor 21 is one or more processors such as a CPU, a GPU, and the like. The processor 21 generates the input signal S1 by receiving the signal generated by the input unit 24 via the interface 23, and transmits the input signal S1 to the control device 1 via the interface 23. Further, the processor 21 supplies the display unit 25 via the interface 23 with the display signal S2 received from the control device 1 via the interface 23.

The memory 22 is configured by various memories such as a RAM and a ROM. The memory 22 stores a program for the task instruction device 2 to execute a predetermined process. The memory 22 is also used as a working memory. The memory 22 may also include non-volatile memory such as a flash memory and a hard disk.

The interface 23 is an interface for electrically connecting the task instruction device 2 to other devices. For example, the interface 23 includes a communication interface for task instructor 2 to communicate by wire or wirelessly communication with other devices. The interface 23 performs an interface operation of the input unit 24 and the display unit 25 to the processor 21 and the memory 22. The input unit 24 is an interface configured to accept an input from a user, and examples of the input unit 24 include a touch panel, a button, a keyboard, and a voice input device. Examples of the display unit 25 include a display and a projector, and the display unit 25 displays information based on the display signal S2 under the control by the processor 21.

The hardware configuration of the task instruction device 2 is not limited to the configuration shown in FIG. 2B. For example, the input unit 24 and the display unit 25 may be configured by devices separately and electrically connected to the task instruction device 2. The task instruction device 2 may be connected to various devices such as a sound output device, a camera, or may incorporate these devices.

(3) Application Information

Next, a data structure of the application information stored in the application information storage unit 41 will be described.

Figure 3:
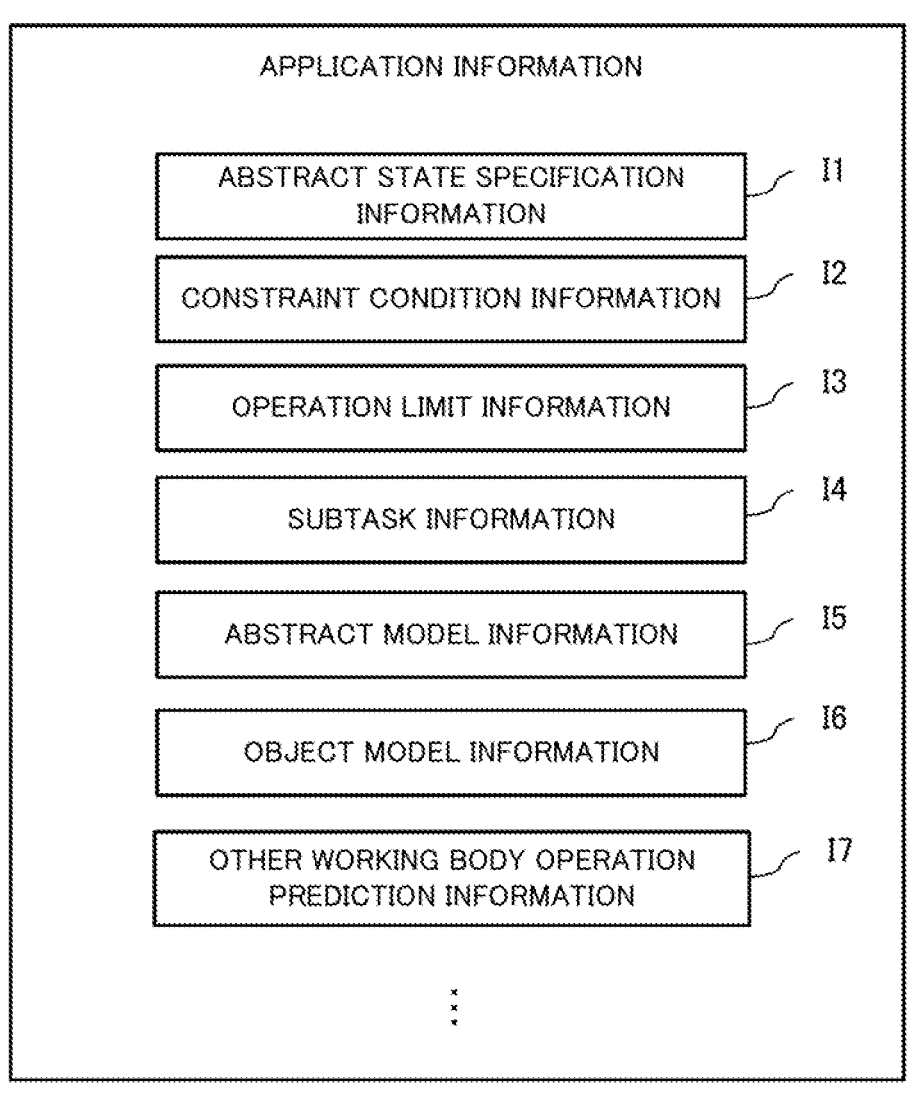
FIG. 3 illustrates an example of a data structure of application information.

FIG. 3 shows an example of a data structure of application information stored in the application information storage unit 41. As shown in FIG. 3, the application information storage unit 41 includes abstract state specification information I1, constraint condition information I2, operation limit information I3, subtask information I4, abstract model information I5, object model information I6, and other working body operation prediction information I7.

The abstract state specification information I1 specifies an abstract state to be defined in order to generate the subtask sequence. The above-mentioned abstract state is an abstract state of an object in the workspace, and is defined as a proposition to be used in the target logical formula to be described later. For example, the abstract state specification information I1 specifies the abstract state to be defined for each type of objective task. It is noted that the objective task, the robot 5 may be a variety of tasks (i.e., tasks necessary to synchronize work) to perform cooperative work with the other working bodies 8. For example, the objective task may be a task (e.g., pick-and-place, assembly of products involving a screw-driving, assistance at a medical site) involving the transfer of an object among the robot 5 and the other working bodies 8 or any other task such that the completion of a subtask to be executed by either one of the other working bodies 8 or the robot 5 is specified as one of the starting conditions of a subtask to be executed by the other.

The constraint condition information I2 indicates constraint conditions of performing the objective task. The constraint condition information I2 indicates, for example, a constraint that the robot 5 (robot arms) must not be in contact with an obstacle when the objective task is pick-and-place, and a constraint that the robot arms must not be in contact with each other, and the like. The constraint condition information I2 may be information in which the constraint conditions suitable for each type of the objective task are recorded.

The operation limit information I3 indicates information on the operation limit of the robot 5 to be controlled by the control device 1. The operation limit information I3 is information, for example, defining the upper limits of the speed, the acceleration, and the angular velocity of the robot 5. It is noted that the operation limit information I3 may be information defining the operation limit for each movable portion or joint of the robot 5.

The subtask information I4 indicates information on subtasks that the robot 5 can accept. For example, when the objective task is pick-and-place, the subtask information I4 defines a subtask "reaching" that is the movement of a robot arm of the robot 5, and a subtask "grasping" that is the grasping by the robot arm. The subtask information I4 may indicate information on subtasks that can be used for each type of objective task.

The abstract model information I5 is information on an abstract model in which the dynamics in the workspace are abstracted. The abstract model is represented by a model in which real dynamics are abstracted by a hybrid system, as will be described later. The abstract model Information I5 includes information indicative of the switching conditions of the dynamics in the above-mentioned hybrid system. For example, in the case of pick-and-place in which the robot 5 grasps a target object and then place it on a predetermined position, one of the switching conditions is that the target object cannot be moved unless it is gripped by the hand of the robot arm. The abstract model information I5 includes information on an abstract model suitable for each type of the objective task.

The object model information I6 is information on the object model of each object in the workspace to be recognized from the output signal S4 generated by the measurement device 7. Examples of the above-described each object include the robot 5, the other working body 8, an obstacle, a tool or other object handled by the robot 5 or the other working body 8. The object model information I6 includes, for example, information required for the control device 1 to recognize the type, position, posture, currently-executed operation, and the like of the described above each object, and three-dimensional shape information such as CAD (Computer Aided Design) data for recognizing the three-dimensional shape of each object. The former information includes the parameters of an inference engine obtained by learning a learning model that is used in a machine learning such as a neural network. For example, the above-mentioned inference engine is preliminarily learned to output the type, the position, the posture, and the like of an object shown in the image when an image is inputted thereto.

The other working body operation prediction information I7 is information to be used for operation prediction of the other working body 8. For example, when the other working body 8 repeatedly executes a predetermined operation sequence, the other working body operation prediction information I7 may be information indicating the operation sequence to be repeated and the cycle period of each operation of the operation sequence. In another example, the other working body operation prediction information I7 may be information for specifying the following operation or the following operation sequence to be performed by the other working body 8 from the past operation sequence including the current operation of the other working body 8. In this case, the other working body operation prediction information I7 may be a look-up table or may be parameters of an inference engine obtained by machine learning.

Further, the other working body operation prediction information I7 may be parameters of an inference engine configured to infer, from the output signal S4, the predicted completion time of the currently-executed operation, the following operation predicted to be executed, or/and required time of the operation. For example, in the case of the objective task in which the other working body 8 needs to pass a work-in-progress (WIP) to the post process, the inference engine is learned to output, when an image or a time series images (moving image data) of the other working body 8 is inputted thereto, the time required for the other working body 8 to pass the work in progress. Examples of the learning model used for learning of such an inference engine include a deep learning such as a convolutional neural network, any other machine learning such as a support vector machine, and a combination thereof.

The other working body operation prediction information I7 may be stored in the application information storage unit 41 for each type of the objective task or for each type of the other working bodies 8. Further, the other working body operation prediction information I7 may be stored in advance in the application information storage unit 41, or may be generated through a learning process to be described later by the control device 1.

In addition to the information described above, the application information storage unit 41 may store various kinds of information related to the generation process of the subtask sequence.

(4) Process Overview of Control Device

Figure 4:
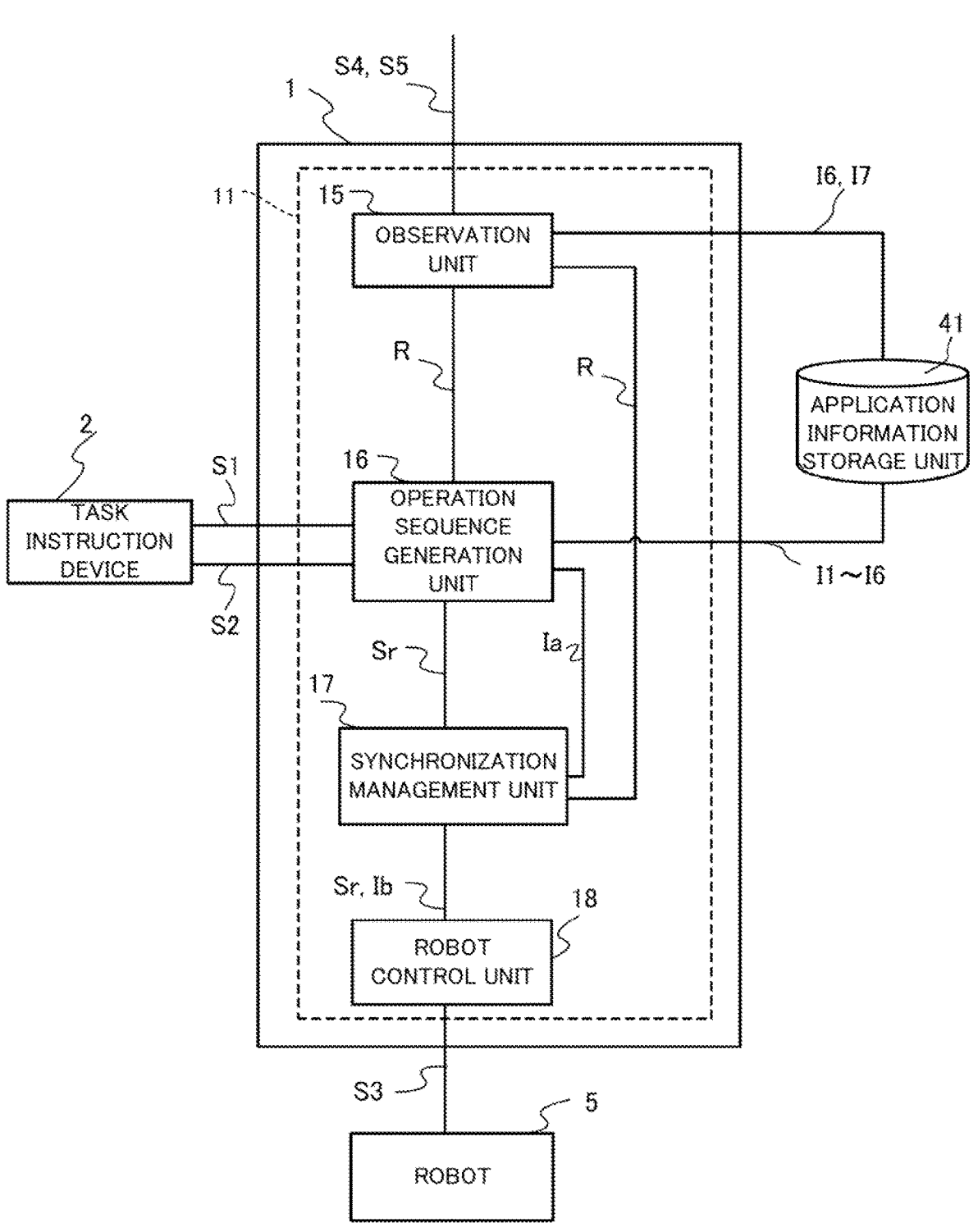
FIG. 4 is an example of a functional block of the control device.

FIG. 4 is an example of a functional block showing an outline of the process executed by the control device 1. The processor 11 of the control device 1 functionally includes an observation unit 15, an operation sequence generation unit 16, a synchronization management unit 17, and a robot control unit 18. In FIG. 4, although an example of data to be transmitted and received between the blocks is shown, it does not exclude any other example. The same applies to the diagrams of another functional block to be described later.

The observation unit 15 observes the state of objects present in the workspace based on at least one of the output signal S4 or the other working body operation related information S5, and supplies the observation result "R" to the operation sequence generation unit 16. Examples of the objects present in the workspace include the robot 5, the other working bodies 8, a target object such as a tool or a work in progress handled by robot 5 or other working bodies 8, and an obstacle. In this case, the observation unit 15 estimates the state of the objects present in the workspace by referring to the object model information I6 and analyzing the output signal S4 by a technique (such as an image processing technique, an image recognition technique, a speech recognition technique, and a technique using a RFID (Radio Frequency Identifier)) for recognizing the environment of the workspace. Then, the observation unit 15 generates the estimation result (also referred to as "state estimation result R1") relating to the state of the objects present in the workspace as a part of the observation result R. The state estimation result R1 includes information on the type, position, and posture of each observed object.

Further, the observation unit 15 refers to the other working body operation prediction information I7, and predicts, based on the output signal S4 or other working body operation related information S5, the operation to be executed by the other moving body 8 to thereby generate the observation result R that is the prediction result (also referred to as "operation prediction result R2") of the operation to be executed by the other working bodies 8. For example, the operation prediction result R2 includes the identification information of the currently-executed operation and the information on the end timing of the currently-executed operation. Further, the operation prediction result R2 may additionally include the identification information of the predicted following operation (or operation sequence) to be executed next and the end timing of the predicted following operation. In this case, for example, the observation unit 15 recognizes the currently-executed operation (and the progress of the operation) based on the output signal S4 or other working body operation related information S5, and then generates the operation prediction result R2 by referring to the other working body operation prediction information I7. In another example, when the parameters of the described-above inference engine for operation prediction is recorded in the other working body operation prediction information I7, the observation unit 15 acquires the operation prediction result R2 by inputting the output signal S4 to the inference engine.

It is noted that the observation unit 15 may generate or update the other working body operation prediction information I7 based on time-series output signals S4 or time-series other working body operation related information S5 supplied in a predetermined time period during the work by the other working bodies 8. For example, the observation unit 15 recognizes the sequence of operations to be executed by the other working bodies 8 based on the time-series output signals S4 or time-series other working body operation related information S5 generated in a predetermined time period. Then, at the time of determining that one or more operations are performed periodically, the observation unit 15 generates the other working body operation prediction information I7 indicative of the periodically-performed operations and the cycle period thereof. Similarly, the observation unit 15 may recognize the sequence of the operations and the operation timing to be executed by the other working body 8 based on the time-series output signals S4 or the time-series other working body operation related information S5 supplied in a predetermined time period during the work by the other working body 8, and then perform machine learning using, as training data, the recognition result and the output signal S4 or the other working body operation related information S5 acquired a predetermined time before. In this case, the observation unit 15 stores the other working body operation prediction information I7 indicative of the parameters of the inference engine configured to output, when the output signal S4 or other working body operation related information S5 is inputted thereto, the predicted operation and the predicted operation timing.

The measurement device 7 may be equipped with a function corresponding to the observation unit 15. In this case, the measurement device 7 supplies the generated observation result R to the control device 1 instead of or in addition to the output signal S4.

When the objective task is specified by the input signal S1, the operation sequence generation unit 16 generates a subtask sequence "Sr" to be executed by the robot 5 based on the observation result R supplied from the observation unit 15 and various kinds of application information stored in the application information storage unit 41. Then, the operation sequence generation unit 16 supplies the generated subtask sequence Sr to the synchronization management unit 17. Here, the subtask sequence Sr includes information indicating the execution order and execution timing of each subtask.

Further, when accepting the objective task, the operation sequence generation unit 16 transmits a display signal S2 for displaying a view for inputting the objective task to the task instruction device 2, thereby causing the task instruction device 2 to display the above-described view. For example, the operation sequence generation unit 16 receives an input of an objective task "carrying the target object X existing at the point A to the point B, and then waiting 30 seconds, and passing the target object X to the other working body 8 performing the post-process" by accepting various operations on the view in which an image of the workspace is displayed based on the output signal S4. Examples of operations described above include a touch operation, a drag-and-drop operation, a button operation, a keyboard operation, and a voice input operation.

When receiving the subtask sequence Sr from the operation sequence generation unit 16, the synchronization management unit 17 transmits the subtask sequence Sr to the robot control unit 18 and causes the robot 5 to execute the subtask sequence Sr. Further, during the execution of the subtask sequence Sr by the robot 5, the synchronization management unit 17 determines, based on the observation result R supplied from the observation unit 15, whether or not the operation executed by the robot 5 and the operation executed by the other working body 8 are synchronized. Then, if it is determined that these operations are not synchronized, the synchronization management unit 17 performs synchronization control for synchronizing these operations.

In the first example of the synchronization control described above, if the operation executed by the robot 5 and the operation executed by the other working bodies 8 are not synchronized, the synchronization management unit 17 supplies the timing adjustment information "Ib" for adjusting the operation timing of the robot 5 to the robot control unit 18. In this case, in place of supplying the timing adjustment information Ib, the synchronization management unit 17 may supply the robot control unit 18 with a new subtask sequence Sr in which the change in the operation timing from the already-generated subtask sequence Sr is reflected. In the second example of the synchronization control described above, when the operation executed by the robot 5 and the operation executed by the other working bodies 8 are not synchronized, the synchronization management unit 17 supplies the operation sequence generation unit 16 with the regeneration instruction information "Ia" instructing the operation sequence generation unit 16 to regenerate the subtask sequence Sr. In this case, the synchronization management unit 17 supplies the robot control unit 18 with the subtask sequence Sr generated by the operation sequence generation unit 16 based on the regeneration instruction information Ia. As will be described later, the synchronization management unit 17 executes the first example and the second example in combination according to division into cases.

The robot control unit 18 performs control for the robot 5 to execute each subtask included in the subtask sequence Sr at a predetermined execution timing (time step) on the basis of the subtask sequence Sr supplied from the synchronization management unit 17. Specifically, the robot control unit 18 performs, by transmitting the control signal S3 to the robot 5, the position control or torque control of the joints of the robot 5 for realizing the subtask sequence Sr. Further, when the new subtask sequence Sr or the timing adjustment information Ib is supplied from the synchronization management unit 17 during control of the robot 5 based on the subtask sequence Sr, the robot control unit 18 performs operation control of the robot 5 based on the subtask sequence Sr in which the timing adjustment information Ib is reflected or the newly-supplied subtask sequence Sr.

It is noted that the robot 5 may be equipped with the function corresponding to the robot control unit 18 in place of the control device 1. In this case, the robot 5 receives the control signal S3 indicating the subtask sequence Sr or the timing adjustment information Ib from the control device 1, thereby executing the position control or the torque control of the joints for realizing the subtask sequence Sr.

Each component of the observation unit 15, the operation sequence generation unit 16, the synchronization management unit 17, and the robot control unit 18 described in FIG. 4 can be realized, for example, by the processor 11 executing the program. More specifically, each component may be implemented by the processor 11 executing a program stored in the memory 12 or the storage device 4. In addition, the necessary programs may be recorded in any nonvolatile recording medium and installed as necessary to realize each component. Each of these components is not limited to being implemented by software using a program, and may be implemented by any combination of hardware, firmware, and software. Each of these components may also be implemented using user programmable integrated circuit, such as, for example, FPGA (field-programmable gate array) or a microcomputer. In this case, the integrated circuit may be used to realize a program to function as each of the above-described components. Thus, each component may be implemented by hardware other than the processor. The above is the same in other example embodiments to be described later.

(5) Details of Synchronization Management Unit

Details of the process executed by the synchronization management unit 17 during execution of the subtask sequence Sr by the robot 5 will be described. The synchronization management unit 17 makes, based on the observation result R supplied from the observation unit 15, a determination of presence or absence of the synchronization between the operation executed by the robot 5 and the operation executed by the other working body (bodies) 8, and generates the regeneration instruction information Ia or the timing adjustment information Ib when it is determined that these operations are not synchronized.

Here, a specific description will be given of the determination of the synchronization between the operation executed by the robot 5 and the operation executed by the other working body 8. In such a case that, unless a first task assigned to either one of the robot 5 or the other working bodies 8 is started or finished, a second task assigned to the other one of the robot 5 or the other working body 8 cannot be started or finished, the first task is called "key task" and the second task is called "dependent task". Namely, the term "dependent task" refers to a task that cannot be started or finished unless another task to be executed by another working body is started or finished, and the term "key task" refers to such a task that, without starting or finishing the task, one or more other tasks cannot be started or finished by another working body. Each of the key task and the dependent task is single subtask or consecutive plural subtasks included in the subtask sequence Sr in the case of the robot 5. For example, when such an objective task is set that the robot 5 needs to go to take a work in progress made by the other working body 8, the key task is the task that the robot 5 goes to take the work in progress and the dependent task is the task that the other working body 8 makes the work in progress.

If it is predicted that, due to the delay of the start timing (starting time) or end timing (ending time) of a key task to be executed by the robot 5 or the other working bodies 8, the corresponding one or more dependent tasks cannot be started or finished, the synchronization management unit 17 determines that the operation executed by the robot 5 and the operation executed by the other working body 8 are not synchronized. In this case, based on the operation prediction result R2, the synchronization management unit 17 predicts the start timing or end timing of the key task or the dependent tasks to be executed by the other working bodies 8. The synchronization management unit 17 predicts, based on the generated subtask sequence Sr, the start timing or end timing of the key task or the dependent task to be executed by the robot 5. In this case, based on the information on the progress of the subtask sequence Sr managed by the robot control unit 18, the synchronization management unit 17 may more accurately predict the start timing or end timing of the key task or the dependent task to be executed by the robot 5 in consideration of the actual operation status of the robot 5.

Next, a supplementary description will be given of a case where the operation executed by the robot 5 and the operation executed by the other working body 8 are determined not to be synchronized.

In the first example, if the synchronization management unit 17 determines that the operation executed by the robot 5 and the operation executed by the other working body 8 can be synchronized by (thanks to) adjusting the execution timing of a subtask to be executed by the robot 5, the synchronization management unit 17 adjusts the execution timing of the subtask to be executed by the robot 5. In contrast, if it determines that the operation executed by the robot 5 and the operation executed by the other working body 8 cannot be synchronized regardless of adjusting the execution timing of one or more subtasks to be executed by the robot 5, the synchronization management unit 17 supplies the regeneration instruction information Ia instructing the regeneration of the subtask sequence Sr to the operation sequence generation unit 16. Here, when adjusting the execution timing of the subtask to be executed by the robot 5, the synchronization management unit 17 may supply the timing adjustment information Ib for adjusting the execution timing of the subtasks to be executed by the robot 5 to the robot control unit 18, or may supply the robot control unit 18 with the subtask sequence Sr in which the adjustment of the execution timing is reflected. In this case, the subtasks subject to adjustment of the execution timing may be a key task or a dependent task and its following subtasks to be executed, or may be all non-executed subtasks included in the subtask sequence Sr.

In the second example, the synchronization management unit 17 instructs the operation sequence generation unit 16 to regenerate the subtask sequence Sr by using the regeneration instruction information Ia regardless of whether or not the above-described synchronization can be performed by adjusting the execution timing of the subtasks to be executed by the robot 5. Then, when the synchronization management unit 17 predicts that the completion of the objective task on the assumption that the regenerated subtask sequence Sr is executed is earlier than the completion of the objective task on the assumption that the execution timing of the initial subtask sequence Sr is adjusted, the synchronization management unit 17 supplies the regenerated subtask sequence Sr to the robot control unit 18. On the other hand, when the completion of the objective task on the assumption that the regenerated subtask sequence Sr is executed is later than the completion of the objective task on the assumption that the execution timing of the initial subtask sequence Sr is adjusted, the synchronization management unit 17 adjusts the execution timing, with respect to the initial subtask sequence Sr, of the subtasks to be executed by the robot 5. When the operation executed by the robot 5 and the operation executed by the other working body 8 cannot be synchronized regardless of the adjustment of the execution timing of the subtasks to be executed by the robot 5, the synchronization management unit 17 supplies the regeneration instruction information Ia for instructing the regeneration of the subtask sequence Sr to the operation sequence generation unit 16 in the same manner as in the first example.

(6) Details of Operation Sequence Generation Unit

Next, detailed process executed by the operation sequence generation unit 16 will be described.

(6-1) Functional Block

Figure 5:
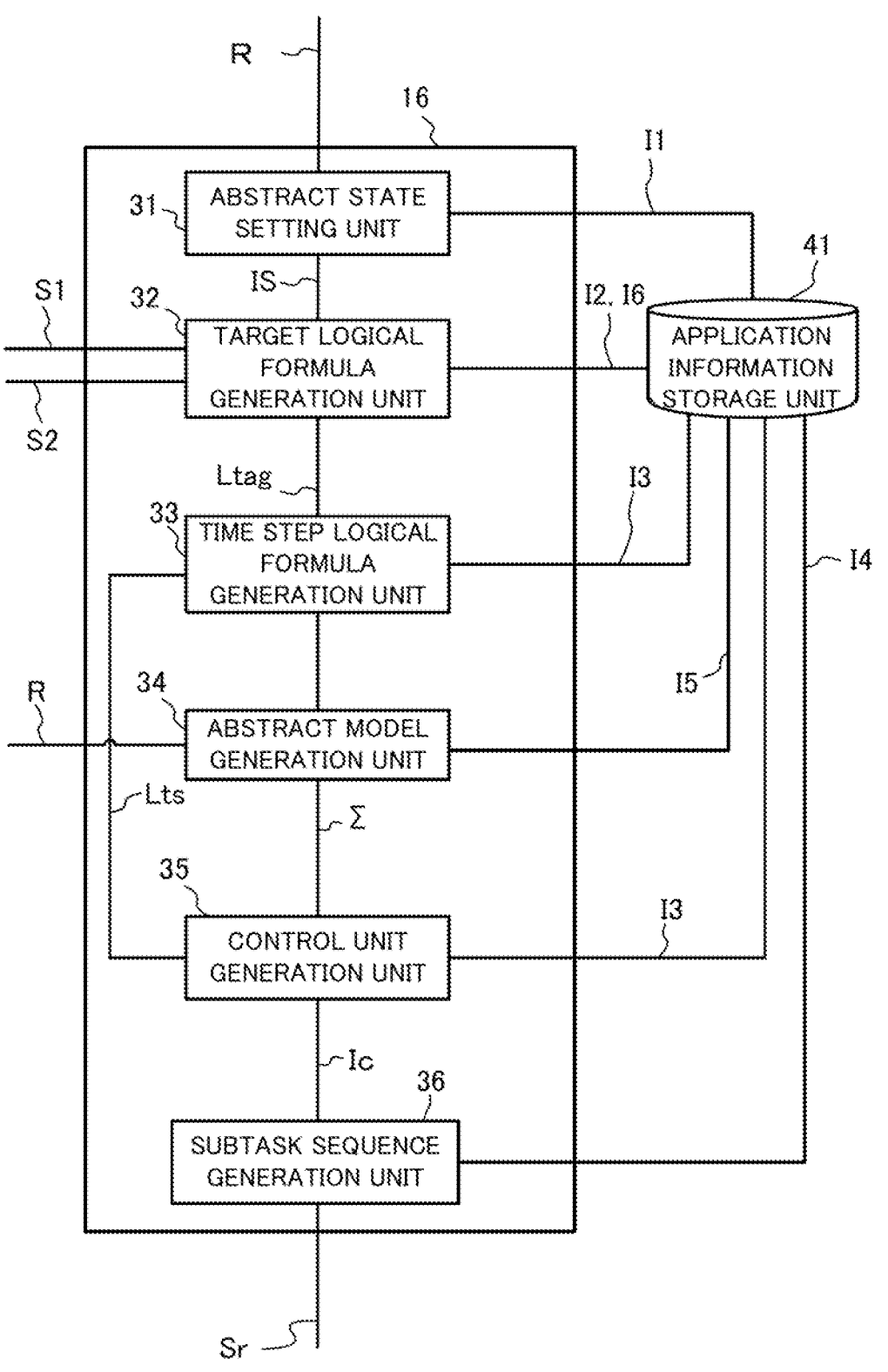
FIG. 5 is an example of a functional block of an operation sequence generation unit.

FIG. 5 is an example of a functional block showing the functional configuration of the operation sequence generation unit 16. The operation sequence generation unit 16 functionally includes an abstract state setting unit 31, a target logical formula generation unit 32, a time step logical formula generation unit 33, an abstract model generation unit 34, a control input generation unit 35, and a subtask sequence generation unit 36.

Based on the observation result R supplied from the observation unit 15 and the abstract state specification information I1 acquired from the application information storage unit 41, the abstract state setting unit 31 sets an abstract state in the workspace that needs to be considered when executing the objective task. In this case, the abstract state setting unit 31 defines a proposition of each abstract state to be expressed in a logical formula. The abstract state setting unit 31 supplies information (also referred to as "abstract state setting information IS") indicating the set abstract states to the target logical formula generation unit 32.

When receiving the input signal S1 relating to the objective task from the input device 2, on the basis of the abstract state setting information IS, the target logical formula generation unit 32 converts the objective task indicated by the input signal S1 into a logical formula (also referred to as a "target logical formula Ltag"), in the form of the temporal logic, representing the final state to be achieved. In this case, by referring to the constraint condition information I2 from the application information storage unit 41, the target logical formula generation unit 32 adds the constraint conditions to be satisfied in executing the objective task to the target logical formula Ltag. Then, the target logical formula generation unit 32 supplies the generated target logical formula Ltag to the time step logical formula generation unit 33. Further, the target logical formula generation unit 32 generates a display signal S2 for displaying a view for receiving an input relating to the objective task, and supplies the display signal S2 to the task instruction device 2.

The time step logical formula generation unit 33 converts the target logical formula Ltag supplied from the target logical formula generation unit 32 to the logical formula (also referred to as "time step logical formula Lts") representing the state at each time step. Then, the time step logical formula generation unit 33 supplies the generated time step logical formula Lts to the control input generation unit 35.

The abstract model generation unit 34 generates an abstract model "$\Sigma$" in which the real dynamics in the workspace are abstracted, based on the observation result R supplied from the observation unit 15 and the abstract model information I5 stored in the application information storage unit 41. In this case, the abstract model generation unit 34 considers the target dynamics as a hybrid system in which the continuous dynamics and the discrete dynamics are mixed, and generates the abstract model $\Sigma$ based on the hybrid system. The method for generating the abstract model $\Sigma$ will be described later. The abstract model generation unit 34 supplies the generated abstract model $\Sigma$ to the control input generation unit 35.

The control input generation unit 35 determines a control input to the robot 5 for each time step so that the time step logic formula Lts supplied from the time step logical formula generation unit 33 and the abstract model $\Sigma$ supplied from the abstract model generation unit 34 are satisfied and so that the evaluation function (e.g., a function representing the amount of energy consumed by the robot) is optimized. Then, the control input generation unit 35 supplies information (also referred to as "control input information Ic") indicating the control input to the robot 5 for each time step to the subtask sequence generation unit 36.

The subtask sequence generation unit 36 generates a subtask sequence Sr based on the control input information Ic supplied from the control input generation unit 35 and the subtask information I4 stored in the application information storage unit 41, and supplies the subtask sequence Sr to the synchronization management unit 17.

(6-2) Abstract State Setting Unit

The abstract state setting unit 31 sets abstract states in the workspace based on the observation result R supplied from the observation unit 15 and the abstract state specification information I1 acquired from the application information storage unit 41. In this case, the abstract state setting unit 31 refers to the abstract state specification information I1 and recognizes an abstract state to be set in the workspace. The abstract state to be set in the workspace varies depending on the type of the objective task. Therefore, when the abstract state to be set is defined for each type of the objective task in the abstract state specification information I1, the abstract state setting unit 31 refers to the abstract state specification information I1 corresponding to the objective task specified by the input signal S1 and recognizes the abstract state to be set.

Figure 6:
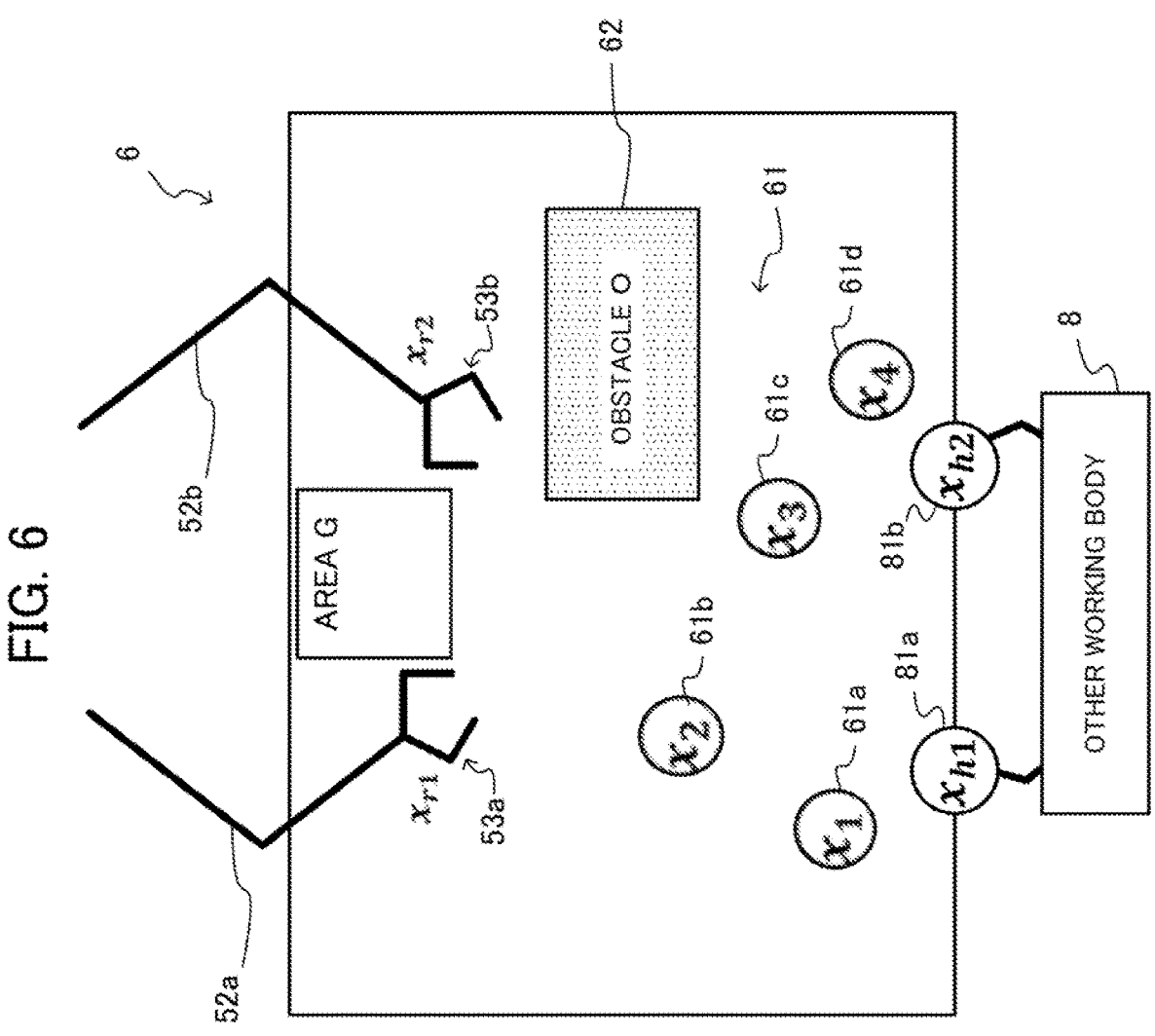
FIG. 6 illustrates a bird's-eye view of the workspace.

FIG. 6 shows a bird's-eye view of the workspace in a case that the objective task is pick-and-place. In the workspace 6 shown in FIG. 6, there are two robot arms 52a and 52b, four target objects 61 (61a to 61d), an obstacle 62, the other working body 8 having other working body hands 81 (81a and 81b), and the area G that is the destination of the target objects 61.

In this example, based on the observation result R which the observation unit 15 outputs based on the output signal S4 outputted by the measurement device 7, the abstract state setting unit 31 recognizes the states of the target objects 61, the existence range of the obstacle 62, the state of the other working body 8, and the existence range of the area G.

Here, the abstract state setting unit 31 recognizes the position vectors "$x_1$" to "$x_4$" indicative of the centers of the target objects 61a to 61d as the positions of the target objects 61a to 61d, respectively. Further, the abstract state setting unit 31 recognizes the position vector "$x_{r1}$" of the robot hand 53a for grasping a target object as the position of the robot arm 52a and the position vector "$x_{r2}$" of the robot hand 53b for grasping a target object as the position of the robot arm 52b.

Further, the abstract state setting unit 31 recognizes the position vector "$x_{h1}$" of the other working body hand 81a, which is one hand of the other working body 8, and the position vector "$x_{h2}$" of the other working body hand 81b, which is the other hand of the other working body 8, as the positions of the feature points relating to various operations by the other working body 8 such as grabbing, releasing, and moving the target object. The abstract state setting unit 31 may determine the other working body hand 81a and the other working body hand 81b to be two other working bodies 8 independent from each other. In this case, the abstract state setting unit 31 recognizes each position of the other working body hand 81a and the other working body hand 81b as the positions of the other working bodies 8.

Similarly, the abstract state setting unit 31 recognizes the postures of the target objects 61a to 61d (it is unnecessary in the example of FIG. 6 because each target object is spherical), the existence range of the obstacle 62, the existence range of the area G, and the like. For example, when assuming that the obstacle 62 is a rectangular parallelepiped and the area G is a rectangle, the abstract state setting unit 31 recognizes the position vector of each vertex of the obstacle 62 and the area G.

The abstract state setting unit 31 determines each abstract state to be defined in the objective task by referring to the abstract state specification information I1. In this case, the abstract state setting unit 31 determines a proposition indicating the each abstract state on the basis of the recognition result (e.g., the number of the target objects and the number of the area(s) for each type) relating to the target objects and the area(s) present in the workspace 6 indicated by the observation result R (especially, the state estimation result R1) and the abstract state designation information I1.

In the example shown in FIG. 6, the abstract state setting unit 31 assigns identification labels "1" to "4" to the target objects 61a to 61d specified by the state estimation result R1, respectively. Further, the abstract state setting unit 31 defines a proposition "$g_i$" that the target object "i" (i=1 to 4) is present in the area G that is the goal point to be finally placed. Further, the abstract state setting unit 31 defines an identification label "O" to the obstacle 62, and defines the proposition "$o_i$" that the target object i interferes with the obstacle O. Furthermore, the abstract state setting unit 31 defines a proposition "h" that a robot arm 52 interferes with another robot arm 52. Similarly, the abstract state setting unit 31 defines a proposition that a robot arm 52 interferes with any of other working body hands 81a and 81b.

In this way, by referring to the abstract state specification information I1, the abstract state setting unit 31 recognizes the abstract state to be defined, and defines the propositions ($g_i$, $o_i$, h in the above-described example) representing the abstract state according to the number of the target objects 61, the number of the robot arms 52, the number of the obstacles 62, the number of the other working bodies 8 and the like. The abstract state setting unit 31 supplies the target logical formula generation unit 32 with the abstract state setting information IS which includes the information indicative of the propositions representing the abstract state.

(6-3) Target Logical Formula Generation Unit

The target logical formula generation unit 32 converts the objective task specified by the input signal S1 into a logical formula using the temporal logic. The input signal S1 may be represented by use of a natural language. Since there are various existing technologies for the method of converting tasks expressed in natural language into logical formulas, the explanation thereof will be omitted in the example embodiment. For example, in the example of FIG. 6, it is herein assumed that the objective task "the target object (i=2) is finally present in the area G" is given. In this case, the target logical formula generation unit 32 generates the logical formula "$\Diamond g_2$" which represents the objective task by using the operator "$\Diamond$" corresponding to "eventually" of the linear logical formula (LTL: Linear Temporal Logic) and the proposition "$g_i$" defined by the abstract state setting unit 31. The target logical formula generation unit 32 may express the logical formula by using any operators based on the temporal logic other than the operator "$\Diamond$" such as logical AND "$\wedge$", logical OR "$\vee$", negative "$\neg$", logical implication "$\Rightarrow$", always "58", next "$\bigcirc$", until "U", etc.). The logical formula may be expressed by any temporal logic other than linear temporal logic such as MTL (Metric Temporal Logic) and STL (Signal Temporal Logic).

Next, the target logical formula generation unit 32 generates the target logical formula Ltag obtained by adding the constraint conditions indicated by the constraint condition information I2 to the logical formula indicating the objective task.

For example, provided that two constraint conditions "the robot arms 52 does not interfere with each other" and "the target object i does not interfere with the obstacle O" for pick-and-place are included in the constraint condition information I2 as the constraint conditions for the pick-and-place shown in FIG. 6, the target logical formula generation unit 32 converts these constraint conditions into logical formulas. Specifically, the constraint target logical formula generation unit 32 converts the above-described two constraint conditions into the following logical formulas by using the proposition "$o_i$" and the proposition "h" defined by the abstract state setting unit 31 according to the description relating to FIG. 6.

$$\Box \neg h$$

$$\wedge_i \Box \neg o_i$$

Therefore, in this case, the target logical formula generation unit 32 generates the following target logical formula Ltag obtained by adding the logical formulas of these constraint conditions to the logical formula "$\Diamond g_2$" corresponding to the objective task "the target object (i=2) is eventually present in the area G".

$$(\Diamond g_2) \wedge (\Box \neg h) \wedge (\wedge_i \Box \neg o_i)$$

In practice, the constraint conditions corresponding to the pick-and-place are not limited to the above-described two constraint conditions and there are other constraint conditions such as "a robot arm 52 always does not interfere with the obstacle O", "plural robot arms 52 do not grasp the same target object", "target objects does not contact with each other", and "a robot arm 52 does not interfere with any of the other working body hands 81a and 81b". Such constraint conditions are also stored in the constraint condition information I2 and are reflected in the target logical formula Ltag.

(6-4) Time Step Logical Formula Generation Unit

The time step logical formula generation unit 33 determines the number of time steps (also referred to as the "target time step number") for completing the objective task, and determines combinations of propositions representing the state at each time step such that the target logical formula Ltag is satisfied with the target time step number. Since the combinations are normally plural, the time step logical formula generation unit 33 generates a logical formula obtained by combining these combinations by logical OR as the time step logical formula Lts. Each of the combinations described above is a candidate of a logical formula representing a sequence of operations to be instructed to the robot 5, and therefore it is hereinafter also referred to as "candidate $\varphi$".

Here, a description will be given of a specific example of the processing executed by the time step logical formula generation unit 33 when the objective task "the target object (i=2) eventually exists in the area G" is set according to the description relating to FIG. 6.

In this case, the following target logical formula Ltag is supplied from the target logical formula generation unit 32 to the time step logical formula generation unit 33.

$$(\Diamond g_2) \wedge (\Box \neg h) \wedge (\wedge_i \Box \neg o_i)$$

In this case, the time-step logical formula generation unit 33 uses the proposition "$g_{i,k}$" that is the extended proposition "$g_i$" to include the concept of time steps. Here, the proposition "$g_{i,k}$" is the proposition that the target object i exists in the area G at the time step k. Here, when the target time step number is set to "3", the target logical formula Ltag is rewritten as follows.

$$( \lozenge g_{2,3}) \wedge (\wedge_{k=1,2,3} \square \neg h_k) \wedge (\wedge_{i,k=1,2,3} \square \neg o_i)$$

$\lozenge g_{2,3}$ can be rewritten as shown in the following equation.

$$\lozenge g_{2,3} = (\neg g_{2,1} \wedge \neg g_{2,2} \wedge g_{2,3}) \vee (\neg g_{2,1} \wedge g_{2,2} \wedge g_{2,3}) \vee (g_{2,1} \wedge \neg g_{2,2} \wedge g_{2,3}) \vee (g_{2,1} \wedge g_{2,2} \wedge g_{2,3})$$

The target logical formula Ltag described above is represented by a logical OR $(\varphi_1 \vee \varphi_2 \vee \varphi_3 \vee \varphi_4)$ of four candidates "$\varphi_1$" to "$\varphi_4$" as shown in below.

$$\varphi_1 = (\neg g_{2,1} \wedge \neg g_{2,2} \wedge g_{2,3}) \wedge (\wedge_{k=1,2,3} \square \neg h_k) \wedge (\wedge_{i,k=1,2,3} \square \neg o_{i,k})$$

$$\varphi_2 = (\neg g_{2,1} \wedge g_{2,2} \wedge g_{2,3}) \wedge (\wedge_{k=1,2,3} \square \neg h_k) \wedge (\wedge_{i,k=1,2,3} \square \neg o_{i,k})$$

$$\varphi_3 = (g_{2,1} \wedge \neg g_{2,2} \wedge g_{2,3}) \wedge (\wedge_{k=1,2,3} \square \neg h_k) \wedge (\wedge_{i,k=1,2,3} \square \neg o_{i,k})$$

$$\varphi_4 = (g_{2,1} \wedge g_{2,2} \wedge g_{2,3}) \wedge (\wedge_{k=1,2,3} \square \neg h_k) \wedge (\wedge_{i,k=1,2,3} \square \neg o_{i,k})$$

Therefore, the time-step logical formula generation unit 33 defines the logical OR of the four candidates $\varphi_1$ to $\varphi_4$ as the time-step logical formula Lts. In this case, the time step logical formula Lts is true if at least one of the four candidates $\varphi_1$ to $\varphi_4$ is true.

Next, a supplementary description will be given of a method for setting the number of target time steps.

For example, the time step logical formula generation unit 33 determines the target time step number based on the prospective (expected) work time designated by the user input. In this case, the time step logical formula generation unit 33 calculates the target time step number based on the prospective work time described above and the information on the time width per time step stored in the memory 12 or the storage device 4. In another example, the time step logical formula generation unit 33 stores, in advance in the memory 12 or the storage device 4, information in which a suitable target time step number is associated with each type of objective task, and determines the target time step number in accordance with the type of objective task to be executed by referring to the information.

In some embodiments, the time step logical formula generation unit 33 sets the target time step number to a predetermined initial value. Then, the time step logical formula generation unit 33 gradually increases the target time step number until the time step logical formula Lts with which the control input generation unit 35 can determine the control input is generated. In this case, if the control input generation unit 35 ends up not being able to derive the optimal solution in the optimization process with the set target time step number, the time step logical formula generation unit 33 add a predetermined number (1 or more integers) to the target time step number.

At this time, the time step logical formula generation unit 33 may set the initial value of the target time step number to a value smaller than the number of time steps corresponding to the work time of the objective task expected by the user. Thus, the time step logical formula generation unit 33 suitably suppresses setting the unnecessarily large target time step number.

(6-5) Abstract Model Generation Unit

The abstract model generation unit 34 generates, based on the abstract model information I5 and the observation result R, the abstract model Σ. Here, the information necessary for generating the abstract model Σ is recorded in the abstract model information I5 for each type of the objective task. For example, when the objective task is pick-and-place, an abstract model in a general format that does not specify the position or number of the target objects, the position of the area where the object is placed, the number of robots 5 (or the number of robot arms 52), and the like is recorded in the abstract model information I5. Then, the abstract model generation unit 34 generates the abstract model Σ by reflecting the state estimation result R1 in the abstract model in the general format including the dynamics of the robot 5 recorded in the abstract model information I5. Thus, the abstract model Σ becomes a model in which the state of objects present in the workspace and the dynamics of the robot 5 are abstractly represented. The state of the objects present in the workspace indicates the position and number of the target objects, the position of the area where the target object is placed, the number of robots 5 and the like in the case of pick-and-place.

Further, the abstract model information I5 includes information on the abstracted dynamics of the other working bodies 8 for each operation to be possibly executed by the other working bodies 8. Therefore, the abstract model generation unit 34 determines, with reference to the abstract model information I5, the abstracted dynamics of the other working bodies 8 corresponding to the predicted operation to be executed by the other working bodies 8 indicated by the operation prediction result R2, and generates the abstract model Σ in which the abstracted dynamics of the other working bodies 8 are reflected.

Here, at the time of work of the objective task by the robot 5, the dynamics in the workspace is frequently switched. For example, in the case of pick-and-place, while the robot arm 52 is gripping the target object i, the target object i can be moved. However, if the robot arm 52 is not gripping the target object i, the target object i cannot be moved.

In view of the above, in the present example embodiment, in the case of pick-and-place, the operation of grasping the target object i is abstracted by the logical variable "$\delta_i$". In this case, for example, the abstract model generation unit 35 can define the abstract model Σ to be set for the workspace shown in FIG. 6 as the following equation (1).

$$\begin{bmatrix} x_{r1} \\ x_{r2} \\ x_1 \\ \vdots \\ x_4 \\ x_{h1} \\ x_{h2} \end{bmatrix}_{k+1} = \begin{bmatrix} I & A \end{bmatrix} \begin{bmatrix} x_{r1} \\ x_{r2} \\ x_1 \\ \vdots \\ x_4 \\ x_{h1} \\ x_{h2} \end{bmatrix}_k + \begin{bmatrix} I & 0 \\ 0 & I \\ \delta_{1,1}I & \delta_{2,1}I \\ \vdots & \vdots \\ \delta_{1,4}I & \delta_{2,4}I \\ & O \end{bmatrix} \begin{bmatrix} u_1 \\ u_2 \end{bmatrix} \qquad (1)$$

$$h_{ij_{min}}(1 - \delta_i) \le$$

$$h_{ij}(x) \le h_{ij_{max}} \delta_i + (\delta_i - 1)\varepsilon$$

Here, "$u_j$" indicates a control input for controlling the robot hand j ("j=1" is the robot hand 53$a$, "j=2" is the robot hand 53$b$), and "I" indicates a unit matrix. "0" indicates a zero matrix. "A" is a drift term representing the dynamics of the other working body hands 81 of the other working bodies 8. It is assumed that the control input is a speed as an example, but it may be an acceleration. Further, "$\delta_{j,i}$" is a logical variable that is set to "1" when the robot hand j grasps the target object i and is set to "0" in other cases. Each of "$x_{r1}$" and "$x_{r2}$" indicates the position vector of the robot hand j (j=1, 2), each of "$x_1$" to "$x_4$" indicates the position vector of the target object i (i=1 to 4), and "$x_{h1}$" and "$x_{h2}$" indicate the position vectors of the other working body hands 81. Further, "h (x)" is a variable to be "h (x)>=0" when the robot hand exists in the vicinity of the target object to the extent that it can grasp the target object, and satisfies the following relationship with the logical variable δ.

$$\delta=1 \Leftrightarrow h(x) \geq 0$$

In this equation, the logical variable δ is set to 1, on the assumption that the robot hand grasps the target object if the robot hand exists in the vicinity of the target object to the extent that it can grasp the target object.

Further, "A" is a drift term representing the dynamics of the other working body hands 81 of the other working bodies 8 and can be defined by the following equation (2) or (3).

$$A = \begin{bmatrix} \dfrac{\partial x_{h1}}{\partial t} & o \\ o & \dfrac{\partial x_{h2}}{\partial t} \end{bmatrix} \Delta t + I \tag{2}$$

$$A = \begin{bmatrix} \Delta x_{h1} & o \\ o & \Delta x_{h2} \end{bmatrix} + I \tag{3}$$

Here, "Δt" in the equation (2) indicates the time step interval, and "$\partial x_{h1}/\partial t$" and "$\partial x_{h2}/\partial t$" indicate the partial differentiations of the other worker hands 81 with respect to a time step. Further, "$\Delta x_{h1}$" and "$\Delta x_{h2}$" in the equation (3) indicate the displacements of the positions of the other working body hands 81 per one time step.

Here, the equation (1) is a difference equation showing the relationship between the state of the objects at the time step k and the state of the objects at the time step k+1. Then, in the above equation (1), since the state of the grasp is represented by a logic variable that is a discrete value, and the movement of the target objects is represented by a continuous value, the equation (1) shows a hybrid system.

The equation (1) considers not the detailed dynamics of the entire robot 5 and the entire other working body 8 but only the dynamics of the robot hands of the robot 5 that actually grasp the target object and dynamics of the other working body hands 81. Thus, it is possible to suitably reduce the calculation amount of the optimization process by the control input generation unit 35.

Further, the abstract model information I5 includes information for deriving the difference equation according to the equation (1) from the observation result R and information on the logical variable corresponding to the operation (the operation of grasping the target object i in the case of pick-and-place) causing the dynamics to switch. Thus, even when there is a variation in the position and the number of the target objects, the area (area G in FIG. 7) where the target objects are to be placed and the number of the robots 5 and the like, the abstract model generation unit 34 can determine the abstract model Σ in accordance with the environment of the target workspace 6 based on the abstract model information I5 and the observation result R.

It is noted that, in place of the model shown in the equation (1), the abstract model generation unit 34 may generate any other hybrid system model such as mixed logical dynamical (MLD) system, Petri nets, automaton, and their combination.

(6-6) Control Input Generation Unit

The control input generation unit 35 determines the optimal control input for the robot 5 with respect to each time step based on the time step logical formula Lts supplied from the time step logical formula generation unit 33 and the abstract model Σ supplied from the abstract model generation unit 34. In this case, the control input generation unit 35 defines an evaluation function for the objective task and solves the optimization problem of minimizing the evaluation function with the abstract model Σ and the time step logical formula Lts which function as constraints. For example, the evaluation function is predetermined for each type of the objective task and stored in the memory 12 or the storage device 4.

For example, when the objective task is pick-and-place, the control input generation unit 35 determines the evaluation function so that the control input "$u_k$" and the distance "$d_k$" between the target object to be carried and the goal point to place the target object are minimized (i.e., the energy spent by the robot 5 is minimized). The distance $d_k$ described above corresponds to the distance at the time step k between the target object (i=2) and the area G when the objective task is "the target object (i=2) is eventually present in the area G".

In this case, for example, the control input generation unit 35 determines the evaluation function to be the sum of the square of the distance $d_k$ and the square of the control input $u_k$ in all time steps, and solves the constrained mixed integer optimization problem shown in the following equation (4) with the abstract model Σ and the time-step logical formula Lts (that is, the logical OR of the candidates $\varphi_i$) which function as the constraint conditions.

$$\min_u \left( \sum_{k=0}^{T} \left( \|d_k\|_2^2 + \|u_k\|_2^2 \right) \right) \text{ s.t. } \sum \vee \phi_i \tag{4}$$

Here, "T" is the number of time steps to be considered in the optimization and it may be a target time step number or may be a predetermined number smaller than the target time step number as described later. In some embodiments, the control input generation unit 35 approximates the logic variable to a continuous value (i.e., solve a continuous relaxation problem). Thereby, the control input generation unit 35 can suitably reduce the calculation amount. When STL is adopted instead of linear temporal logic (LTL), it can be described as a nonlinear optimization problem.

Further, if the target time step number is long (e.g., larger than a predetermined threshold value), the control input generation unit 35 may set the time step number to be used for optimization to a value (e.g., the threshold value described above) smaller than the target time step number. In this case, the control input generation unit 35 sequentially determines the control input $u_k$ by solving the optimization problem based on the above-mentioned equation, for example, every time a predetermined number of time steps elapses.

In some embodiments, the control input generation unit 35 may solve the above-mentioned optimization problem for each predetermined event corresponding to the intermediate state for the accomplishment state of the objective task and determine the control input $u_k$ to be used. In this case, the control input generation unit 35 determines the time step number to be used for the optimization to be the number of time steps up to the next event occurrence. The event described above is, for example, an event in which the dynamics switches in the workspace. For example, when pick-and-place is the objective task, examples of the event include "the robot 5 grasps the object" and "the robot 5 finishes carrying one of the target objects to the destination (goal) point." For example, the event is predetermined for each type of the objective task, and information indicative of one or more events for each type of the objective task is stored in the storage device 4.

(6-7) Subtask Sequence Generation Unit

The subtask sequence generation unit 36 generates a subtask sequence based on the control input information Ic supplied from the control input generation unit 35 and the subtask information I4 stored in the application information storage unit 41. In this case, by referring to the subtask information I4, the subtask sequence generation unit 36 recognizes subtasks that the robot 5 can accept and converts the control input for each time step indicated by the control input information Ic into subtasks.

For example, in the subtask information I4, there are defined functions representing two subtasks, the movement (reaching) of the robot hand and the grasping by the robot hand, as subtasks that can be accepted by the robot 5 when the objective task is pick-and-place. In this case, for example, the function "Move" representing the reaching is a function that uses the following three arguments (parameters): the initial state of the robot 5 before the function is executed; the final state of the robot 5 after the function is executed; and the time to be required for executing the function. In addition, for example, the function "Grasp" representing the grasping is a function that uses the following these arguments: the state of the robot 5 before the function is executed; the state of the target object to be grasped before the function is executed; and the logical variable δ. Here, the function "Grasp" indicates performing a grasping operation when the logical variable δ is "1", and indicates performing a releasing operation when the logic variable δ is "0". In this case, the subtask sequence generation unit 36 determines the function "Move" based on the trajectory of the robot hand determined by the control input for each time step indicated by the control input information Ic, and determines the function "Grasp" based on the transition of the logical variable δ for each time step indicated by the control input information Ic.

Then, the subtask sequence generation unit 36 generates a subtask sequence Sr configured by the function "Move" and the function "Grasp", and supplies the subtask sequence Sr to the synchronization management unit 17. For example, if the objective task is "the target object (i=2) is finally present in the area G", the subtask sequence generation unit 36 generates a subtask sequence of the function "Move", the function "Grasp", the function "Move", and the function "Grasp" for the robot hand closest to the target object (i=2). In this case, the robot hand closest to the target object (i=2) moves to the position of the target object (i=2) by the function "Move", grasps the target object (i=2) by the function "Grasp", moves to the area G by the function "Move", and places the target object (i=2) in the area G by the function "Grasp".

(7) Process Flow

Figure 7:
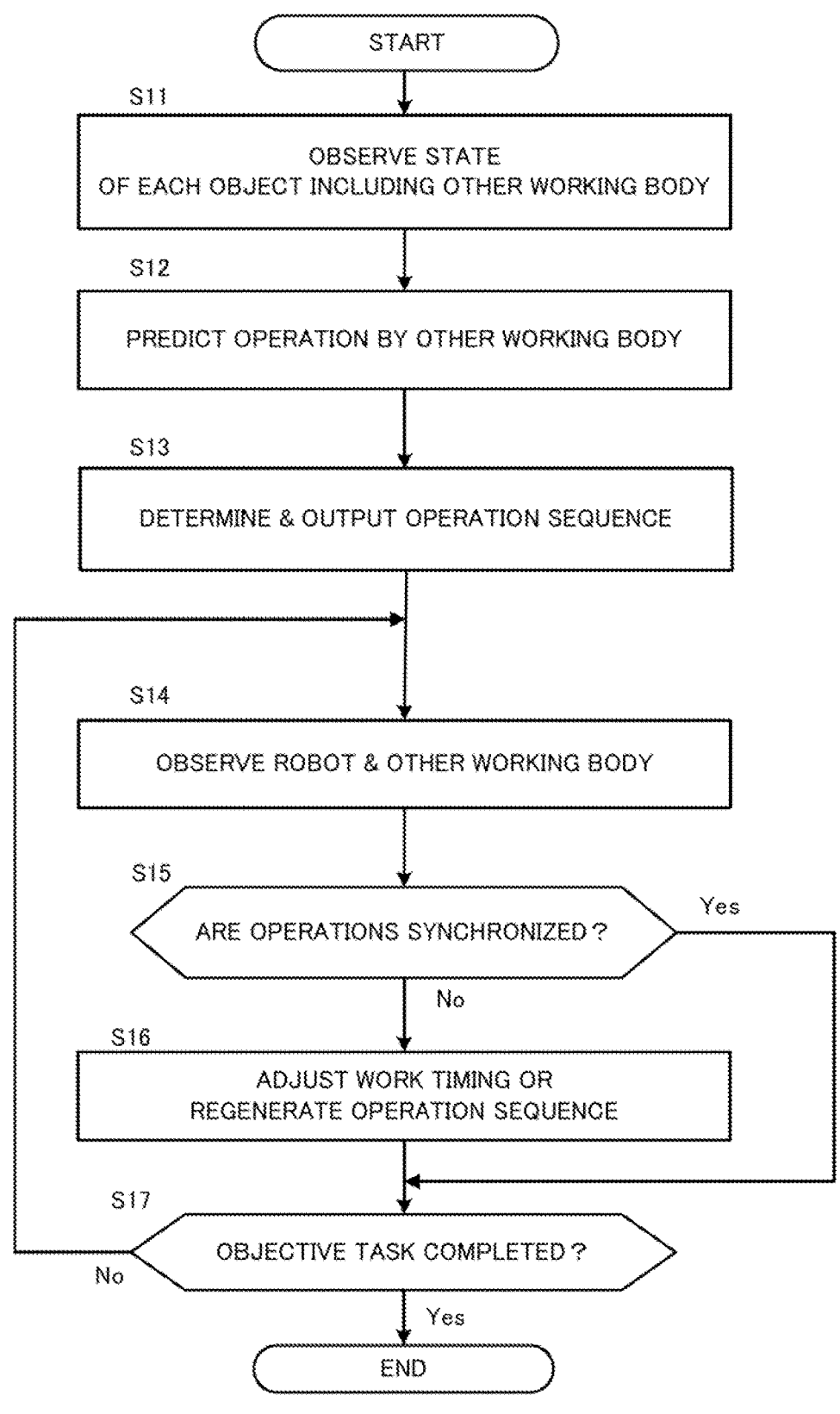
FIG. 7 is an example of a flowchart showing an outline of the robot control process performed by the control device in the first example embodiment.

FIG. 7 is an example of a flowchart showing an outline of the robot control process performed by the control device 1 in the first example embodiment.

First, the observation unit 15 of the control device 1 observes, based on the output signal S4 supplied from the measurement device 7, the state of each object present in the workspace including the other working bodies 8 (step S11). Thus, the observation unit 15 generates the state estimation result R1. Further, the observation unit 15 refers to the other working body operation prediction information I7 and thereby predicts the operation to be executed by the other working bodies 8 based on at least one of the state estimation result R1, the output signal S4, or the other working body operation related information S5 (step S12). Thus, the observation unit 15 generates the operation prediction result R2.

Next, the operation sequence generation unit 16 determines the subtask sequence Sr which is an operation sequence of the robot 5 based on the state estimation result R1, the operation prediction result R2, and the application information (step S13). Then, the robot control unit 18 supplies the control signal S3 based on the generated subtask sequence Sr to the robot 5 and controls the robot 5 to operate according to the generated subtask sequence Sr.

Thereafter, the observation unit 15 performs observation of the robot 5 and the other working bodies 8 during a time period in which the robot 5 is in operation based on the subtask sequence Sr (step S14). Accordingly, the observation unit 15 generates the observation result R relating to the robot 5 and the other working bodies 8.

Then, the synchronization management unit 17 determines whether or not the operation executed by the robot 5 and the operation executed by the other working bodies 8 are synchronized (step S15). Then, if the synchronization management unit 17 determines that the operation executed by the robot 5 and the operation executed by the other working bodies 8 are synchronized (step S15; Yes), the process proceeds to step S17. On the other hand, if the synchronization management unit 17 determines that the operation executed by the robot 5 and the operation executed by the other working bodies 8 are not synchronized (step S15; No), the synchronization management unit 17 performs adjustment by regeneration of the operation sequence or by change of the work timing of the robot 5 (step S16). In this case, for example, the synchronization management unit 17 transmits, to the robot control unit 18, the timing adjustment information Ib or the subtask sequence Sr whose operation timing is adjusted. In another example, the synchronization management unit 17 transmits the regeneration instruction information Ia to the operation sequence generation unit 16 and transmits, to the robot control unit 18, the subtask sequence Sr received from the operation sequence generation unit 16 as a response.

Then, the control device 1 determines whether or not the objective task has been completed (step S17). In this case, the control device 1 determines whether or not the objective task is completed, for example, based on the observation result R generated from the output signal S4 or a notification signal of the completion of the objective task supplied from the robot 5. When it is determined that the objective task has been completed (step S17; Yes), the control device 1 terminates the processing of the flowchart. On the other hand, when the control device 1 determines that the objective task has not been completed (step S17; No), the control device 1 goes back to the process at step S14 and the synchronization management unit 17 performs the determination of the synchronization between the operation executed by the robot 5 and the operation executed by the other working bodies 8.

(9) Modification

The block configuration of the synchronization management unit 17 shown in FIG. 5 is an example, and various changes may be applied thereto.

For example, if the information on the candidates φ of the sequence of operations to command the robot 5 is stored in advance in the storage device 4, the synchronization management unit 17 executes, based on the above information, the optimization process relating to the control input generation unit 35. Accordingly, the synchronization management unit 17 performs the selection of the optimal candidate φ and the determination of the control input to the robot 5. In this case, the synchronization management unit 17 may not have a function corresponding to the abstract state setting unit 31, the target logical formula generation unit 32 and the time step logical formula generation unit 33. As described above, information on the execution result of some of the function blocks of the synchronization management unit 17 shown in FIG. 5 may be stored in the application information storage unit 41 in advance.

In another example, the application information includes in advance design information such as a flowchart for designing the subtask sequence Sr corresponding to the objective task, and the synchronization management unit 17 may generate the subtask sequence Sr by referring to the design information. A specific example for executing a task based on a previously-designed task sequence is disclosed in JP 2017-39170A. Further, the synchronization management unit 17 may generate a subtask sequence Sr indicating a sequence of subtasks to be executed by the robot 5 specified based on the input signal S1 supplied from the task instruction device 2.

Second Example Embodiment

Figure 8:
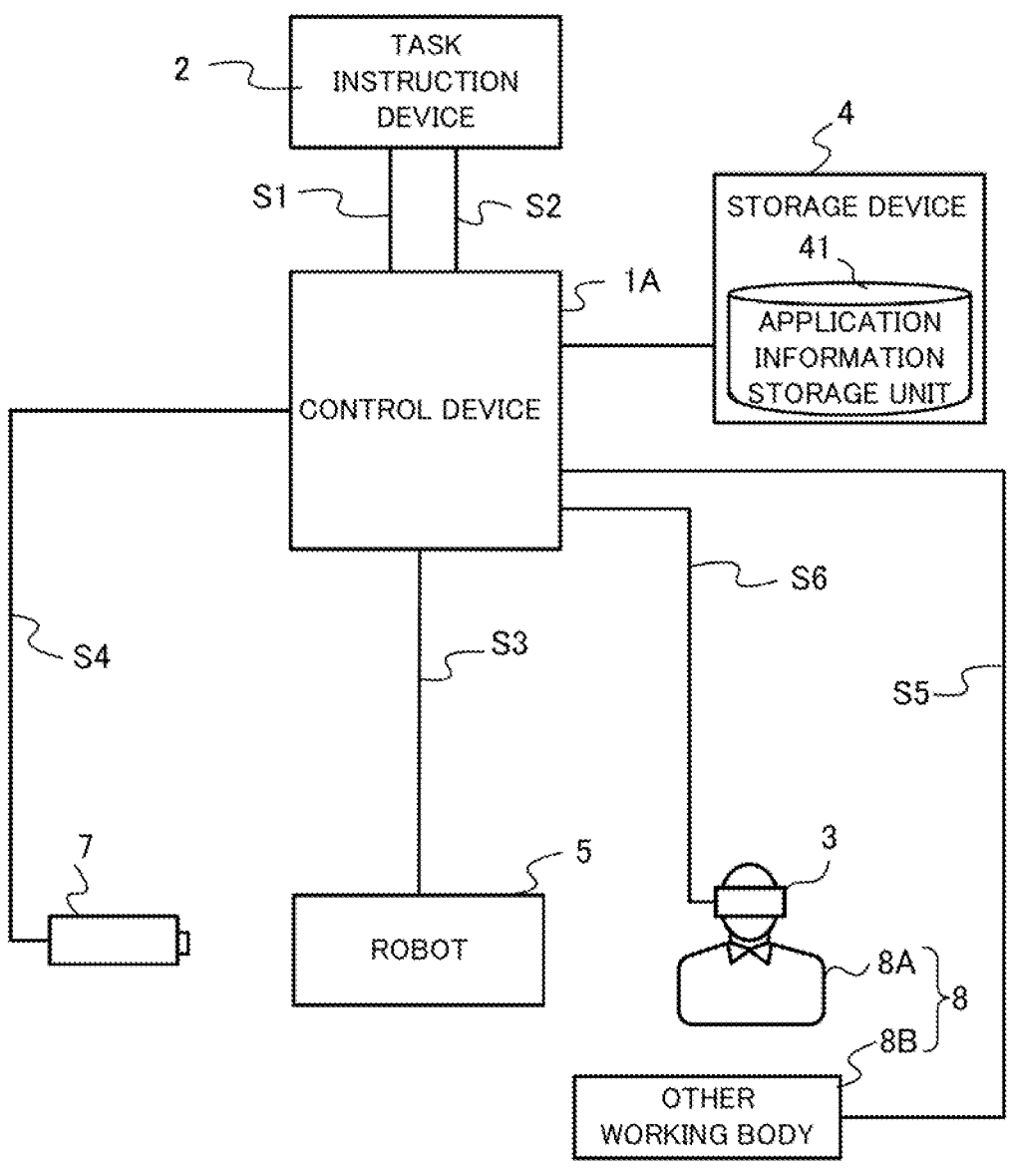
FIG. 8 illustrates a configuration of a robot control system in the second example embodiment.

FIG. 8 shows the configuration of a robot control system 100A in the second example embodiment. The robot control system 100A mainly includes a control device 1A, a task instruction device 2, a robot operation display device 3, a storage device 4, a robot 5, a measurement device 7, and other working bodies 8. The control device 1A according to the second example embodiment differs from the one according to the first example embodiment in that the robot operation display device 3 gives a notification relating to the operation to be executed by the robot 5 to the other working body 8 (worker 8A in FIG. 8). Hereinafter, the same components as in the first example embodiment are appropriately denoted by the same reference numerals, and description thereof will be omitted accordingly.

The control device 1A has the same hardware configuration as the hardware configuration of the control device 1 shown in FIG. 2A. Then, after the generation of the subtask sequence Sr for the robot 5, the control device 1A generates a display signal "S6" relating to the operation to be executed by the robot 5 based on the subtask sequence Sr, and transmits the display signal S6 to the robot operation display device 3. The control device 1A and the robot operation display device 3 performs data communication, via a communication network, or by direct wired or wireless communication.

The robot operation display device 3 displays, based on the display signal S6 supplied from the control device 1A, information on the operation to be executed by the robot 5. The robot operation display device 3 is a wearable device such as a head-mounted display capable of displaying by augmented reality (AR: Augmented Reality), and displays the information on the operation to be executed by the robot 5 over the actual scenery to be visually recognized by the worker 8A.

Figure 9:
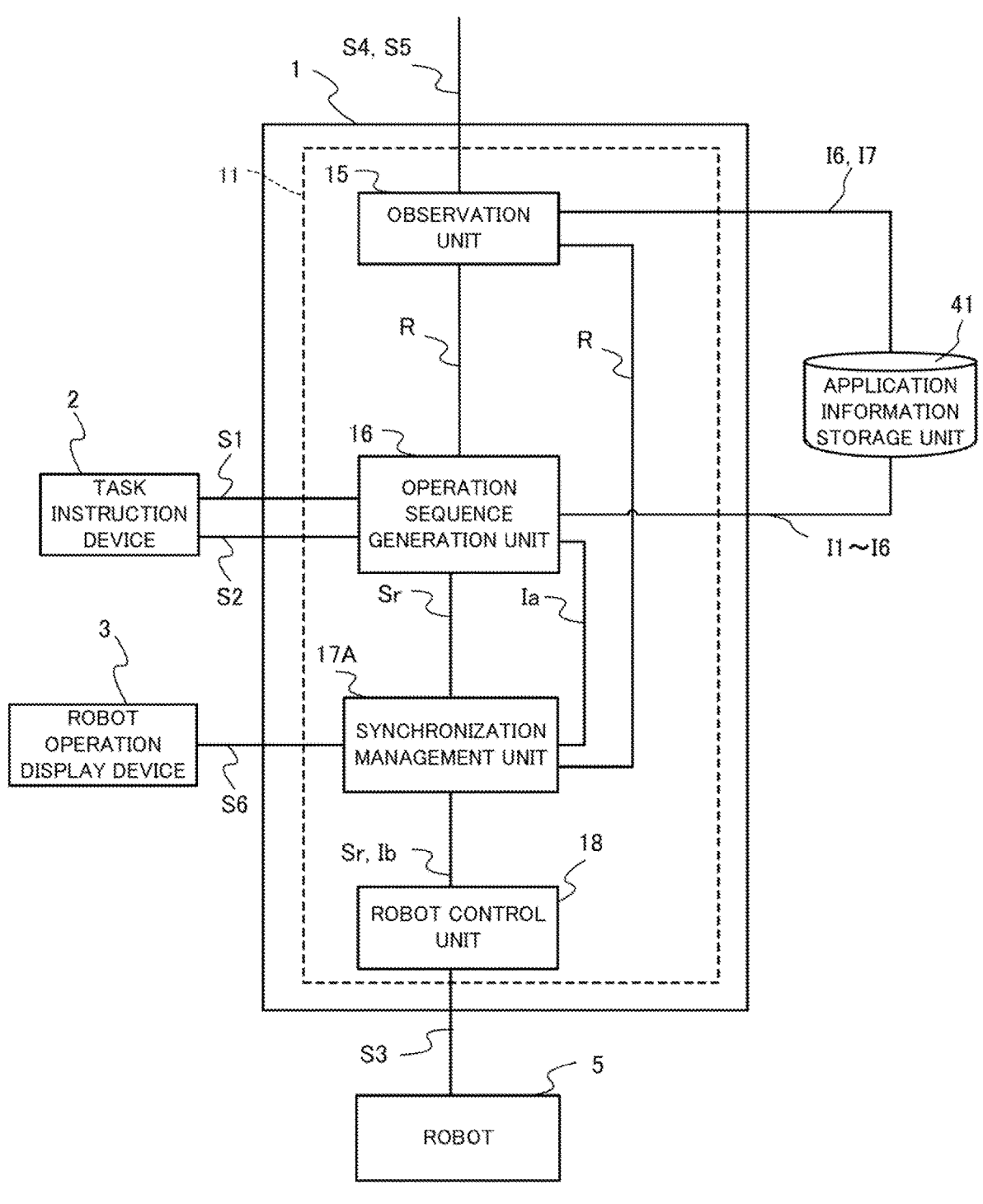
FIG. 9 is an example of a block configuration of the control device in the second example embodiment.

FIG. 9 is an example of a block configuration of the processor 11 in the second example embodiment. As shown in FIG. 9, the processor 11 includes, like the first example embodiment, the observation unit 15, the operation sequence generation unit 16, a synchronization management unit 17A, and the robot control unit 18. Then, the synchronization management unit 17A generates, based on the subtask sequence Sr, the display signal S6 relating to the operation to be executed by the robot 5, and supplies the display signal S6 to the robot operation display device 3 via the interface 13.

In the first example, the synchronization management unit 17A displays the future state of the robot 5 after a predetermined time (e.g., after a few seconds) on the robot operation display device 3. In this case, for example, by using a simulation technique for simulating the operation to be executed by the robot 5, the synchronization management unit 17A recognizes the future position (and posture) of the robot 5 in a predetermined time based on the current state of the robot 5 indicated by the subtask sequence Sr and the state estimation result R1. Then, the synchronization management unit 17A generates the display signal S6 for displaying an image representing the robot 5 on the recognized future position of the robot 5. In this case, the image representing the robot 5 may be a computer graphic obtained by simulating the robot 5, or may be a planar image such as an icon that abstractly represents the robot 5. Further, the image representing the robot 5 may be an image showing only a portion (e.g., hand) of the robot 5 particularly related to the work. Then, based on the display signal S6, the robot operation display device 3 displays, over the scenery visually recognized by the worker 8A, an image representing the robot 5 at the position where the robot 5 is predicted to exist in a predetermined time (a predetermined time later). In this case, the robot operation display device 3 preliminarily performs calibration to be generally performed by an AR device thereby to display the image representing the robot 5 at the position specified by the synchronization management unit 17A via the display signal S6.

According to the first example, the synchronization management unit 17A causes the worker 8A to grasp the future state of the robot 5 in a predetermined time, and thereby can suitably urge the worker 8A to move in accordance with the operation executed by the robot 5. Therefore, in this case, the synchronization management unit 17A facilitates the cooperation between the operation executed by the robot 5 and the operation executed by the worker 8A thereby to suitably assist the robot 5 and the worker 8A to efficiently perform cooperative work.

In the second example, the synchronization management unit 17A displays, on the robot operation display device 3, the expected time of the start of the next operation to be executed by the robot 5 associated with the operation executed by the worker 8A. The above-described "next operation to be executed by the robot 5" may be a key task to be executed next by the robot 5, or may be a dependent task to be executed next by the robot 5. In this case, the synchronization management unit 17A generates a display signal S6 for displaying the expected time of the start of the next operation to be executed by the robot 5, and transmits the generated display signal S6 to the robot operation display device 3. In this case, the robot operation display device 3 displays, based on the display signal S6, the expected time of the start of the next operation to be executed by the robot 5. Also in the second example embodiment, the synchronization management unit 17A prompts synchronization between the operation executed by the robot 5 and the operation executed by the worker thereby to suitably assist the robot 5 and the worker 8A to efficiently perform cooperative work.

Figure 10:
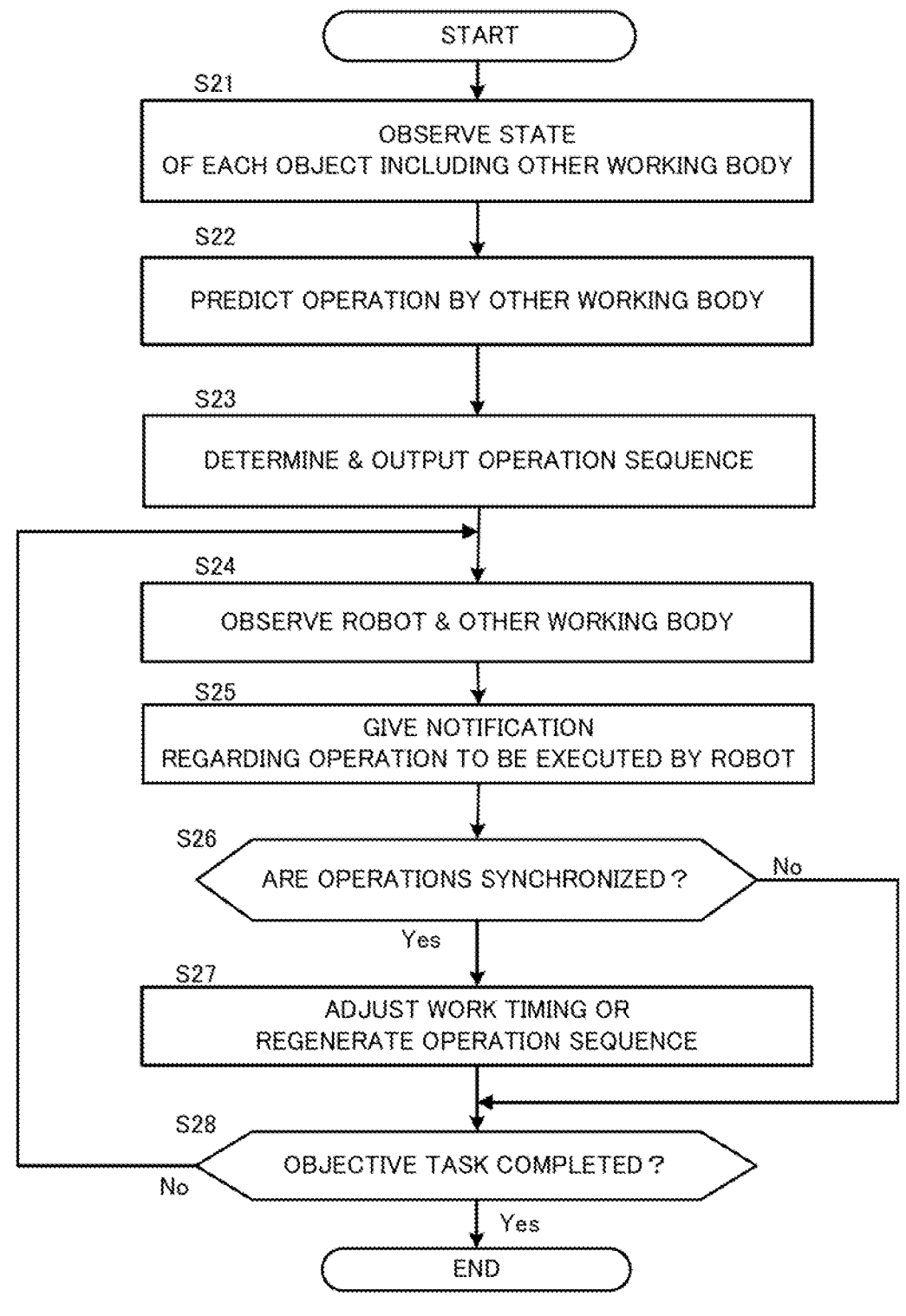
FIG. 10 is an example of a flowchart showing an outline of the robot control process performed by the control device in the second example embodiment.

FIG. 10 is an example of a flowchart showing an outline of the robot control process performed by the control device 1 in the second example embodiment.

First, the observation unit 15 of the control device 1 observes the state of each object present in the workspace (step S21), and predicts the operation executed by the other working body 8 (step S22). Next, the operation sequence generation unit 16 determines the subtask sequence Sr, and the robot control unit 18 starts the control of the robot 5 by the subtask sequence Sr (step S23). Thereafter, the observation unit 15 observes the robot 5 and the other working body 8 during a time period in which the robot 5 is in operation based on the subtask sequence Sr (step S24).

Then, the synchronization management unit 17A gives a notification regarding the operation executed by the robot 5 (step S25). In this case, the synchronization management unit 17A generates a display signal S6 relating to the operation to be executed by the robot 5, and transmits the display signal S6 to the robot operation display device 3 thereby to cause the robot operation device 3 to display the information on the operation to be executed by the robot 5. Accordingly, it is possible to suitably assist the robot 5 and the worker 8A to perform the cooperative operation efficiently.

Then, the synchronization management unit 17A determines whether or not the operation executed by the robot 5 and the operation executed by the other working bodies 8 are synchronized (step S26). Then, if the synchronization management unit 17A determines that the operation executed by the robot 5 and the operation executed by the other working body 8 are synchronized (step S26; Yes), the process proceeds to step S28. On the other hand, if the synchronization management unit 17A determines that the operation executed by the robot 5 and the operation executed by the other working bodies 8 are not synchronized (step S26; No), the synchronization management unit 17A performs adjustment by changing the work timing of the robot or by regenerating the operation sequence of the operation timing of the robot 5 (step S27). Then, when the control device 1 determines that the objective task has been completed (step S28; Yes), it ends the process of the flowchart. On the other hand, when the control device 1 determines that the objective task has not been completed (step S28; No), the control device 1 goes back to the process at step S24 and continues to make the determination of the synchronization between the operation executed by the robot 5 and the operation executed by the other working bodies 8 and perform the display control of the robot operation display device 3.

The robot operation display device 3 is not limited to a head-mounted display configured to realize an AR, and it may be any of various display devices such as a monitor, a projector, and a time counter. For example, if the robot operation display device 3 is a monitor or projector, the robot operation display device 3 may superimpose an image representing the robot 5 based on the first example described above on the image captured by the measurement device 7 or may display the expected time based on the second example described above.

Further, the synchronization management unit 17A may output a sound relating to the operation to be executed by the robot 5 by a sound output device in place of the robot operation display device 3. In this case, for example, the synchronization management unit 17A causes the sound output device to output the sound indicating the expected time of the start of the next operation of the robot 5. In another example, the synchronization management unit 17A recognizes the future position where the robot 5 will be present in a predetermined time, and if the worker 8A is present at the future position, the synchronization management unit 17A outputs, by the sound output device, a voice guide prompting the worker 8A to move.

Further, in some embodiments, the control device 1 may notify the worker 8A of information on the operation to be executed by the robot 5 by controlling the gesture of the robot 5 instead of controlling the robot operation display device 3. Thus, the control device 1 can notify the worker 8A of information relating to the operation to be executed by the robot 5 in an intuitive and easy-to-understand manner.

In this case, for example, the synchronization management unit 17A recognizes the future position where the robot 5 will be present after a predetermined time, and if the synchronization management unit 17A determines that the worker 8A is present at the future position, the synchronization management unit 17A causes the robot 5 to perform a gesture prompting the worker 8A to move (escape) by transmitting the control signal to the robot 5. In another example embodiment, when the robot 5 terminates a predetermined subtask, the control device 1 causes the robot 5 to perform a gesture for notifying the worker 8A of the termination of the predetermined subtask. The predetermined subtask may be a key task or a subtask to be executed a predetermined number before a key task. In this case, preferably, the above-described gesture is registered in the subtask information I4 as a subtask, and the operation sequence generation unit 16 generates a subtask sequence Sr into which the subtask corresponding to the above-described gesture is inserted next to the predetermined subtask described above. Accordingly, the operation sequence generation unit 16 can suitably cause the robot 5 to perform a gesture for notifying the worker 8A of completion of the task executed by the robot 5.

Third Example Embodiment

Figure 11:
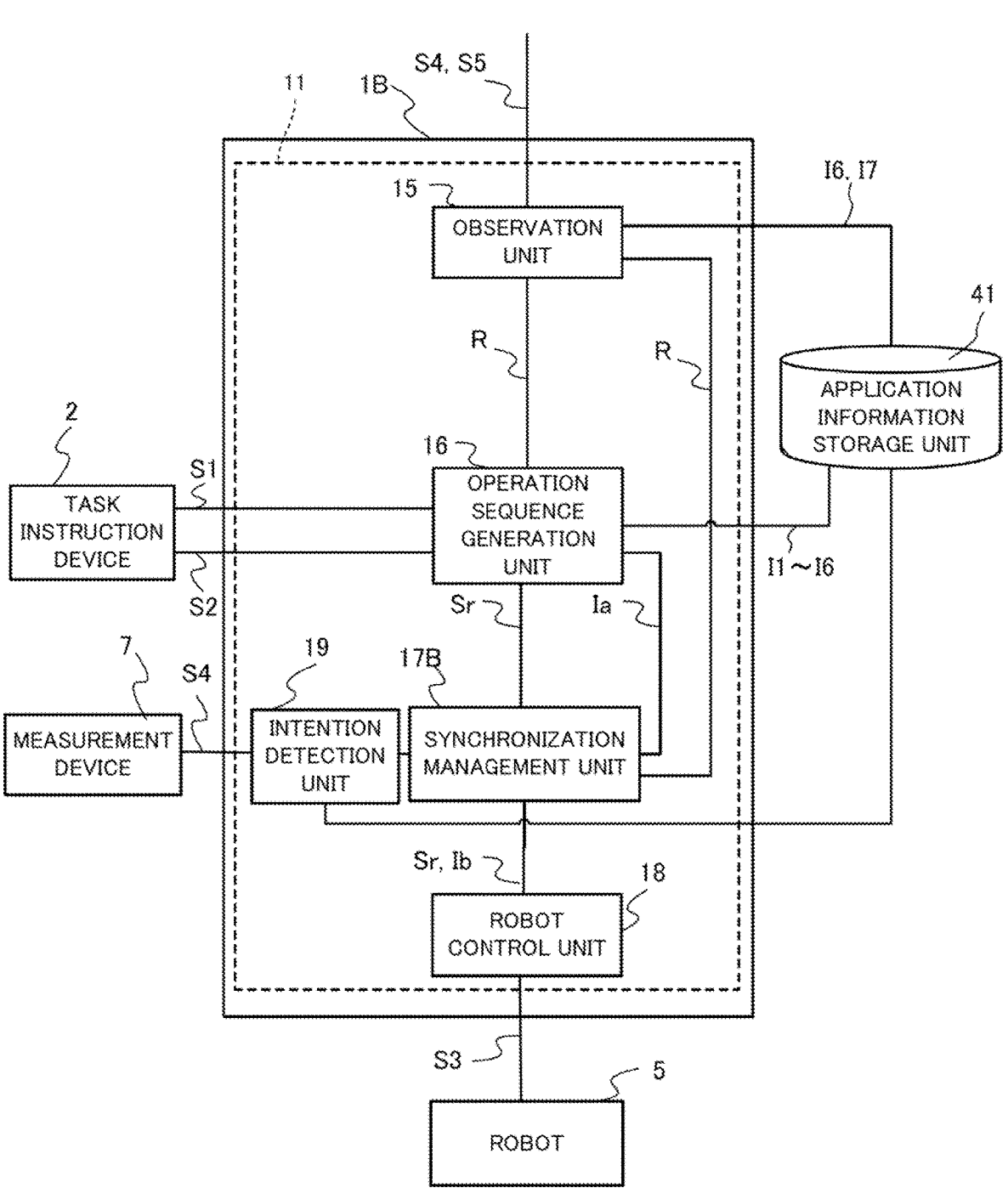
FIG. 11 is an example of a block configuration of the control device in the third example embodiment.

FIG. 11 shows the functional block configuration of the control device 1B in the third example embodiment. The control device 1B differs from the first example embodiment in that it detects the intention of other working bodies 8 and adjusts the operation timing of the robot 5 or regenerates the subtask sequence Sr based on the detected intention. Hereinafter, the same components as in the first example embodiment are appropriately denoted by the same reference numerals, and description thereof will be omitted.

The control device 1B has the same hardware configuration as the hardware configuration of the control device 1 shown in FIG. 2A. Then, the processor 11 of the control device 1B includes an observation unit 15, an operation sequence generation unit 16, a synchronization management unit 17B, a robot control unit 18, and an intention detection unit 19.

The intention detection unit 19 refers to the application information and detects the intention of the operation performed by a worker based on the output signal S4 generated by the measurement device 7. Then, in this case, based on the detection result generated by the intention detection unit 19, the synchronization management unit 17B supplies the robot control unit 18 with the timing adjustment information Ib or the subtask sequence Sr in which the timing adjustment information Ib is reflected, or supplies the regeneration instruction information Ia to the operation sequence generation unit 16.

In this case, in the first example, when the output signal S4 is an image in which a worker is photographed, the intention detection unit 19 detects the gesture of the worker from the image and detects the intention corresponding to the gesture. In this case, for example, the application information storage unit 41 preliminarily stores information necessary for gesture recognition and information in which each gesture and intention are associated. The information necessary for gesture recognition may be the parameters of an inference engine learned to output the detection result (presence/absence of gesture and type of gesture) of the gesture from an inputted image or and may be template information necessary to perform gesture recognition in template matching. For example, the worker performs a gesture to return the palm of the hand if he wishes to immediately receive a work in progress required for the work from the robot 5. In this case, the intention detection unit 19 recognizes the above-described gesture based on the output signal S4 that is an image, and supplies the synchronization management unit 17B with a detection result indicative of the detection of the gesture by the worker indicating that the worker wishes to immediately receive, from the robot 5, the work in progress required for the operation.

In the second example, in such a case that the measurement device 7 is a microphone and the output signal S4 is a worker's voice signal, the intention detection unit 19 detects, by performing the voice recognition process based on the output signal S4, the worker's intention corresponding to the voice by the worker. In this case, information necessary for voice recognition is stored in the application information storage unit 41. For example, the worker says that he wishes to immediately receive the work in progress required for the operation. In this case, the intention detection unit 19 recognizes the above-described voice based on the output signal S4 that is an audio signal generated by the measurement device 7, and supplies the synchronization management unit 17B with a detection result indicative of the detection of the voice that the worker wishes to immediately receive the work in progress required for the operation.

Figure 12:
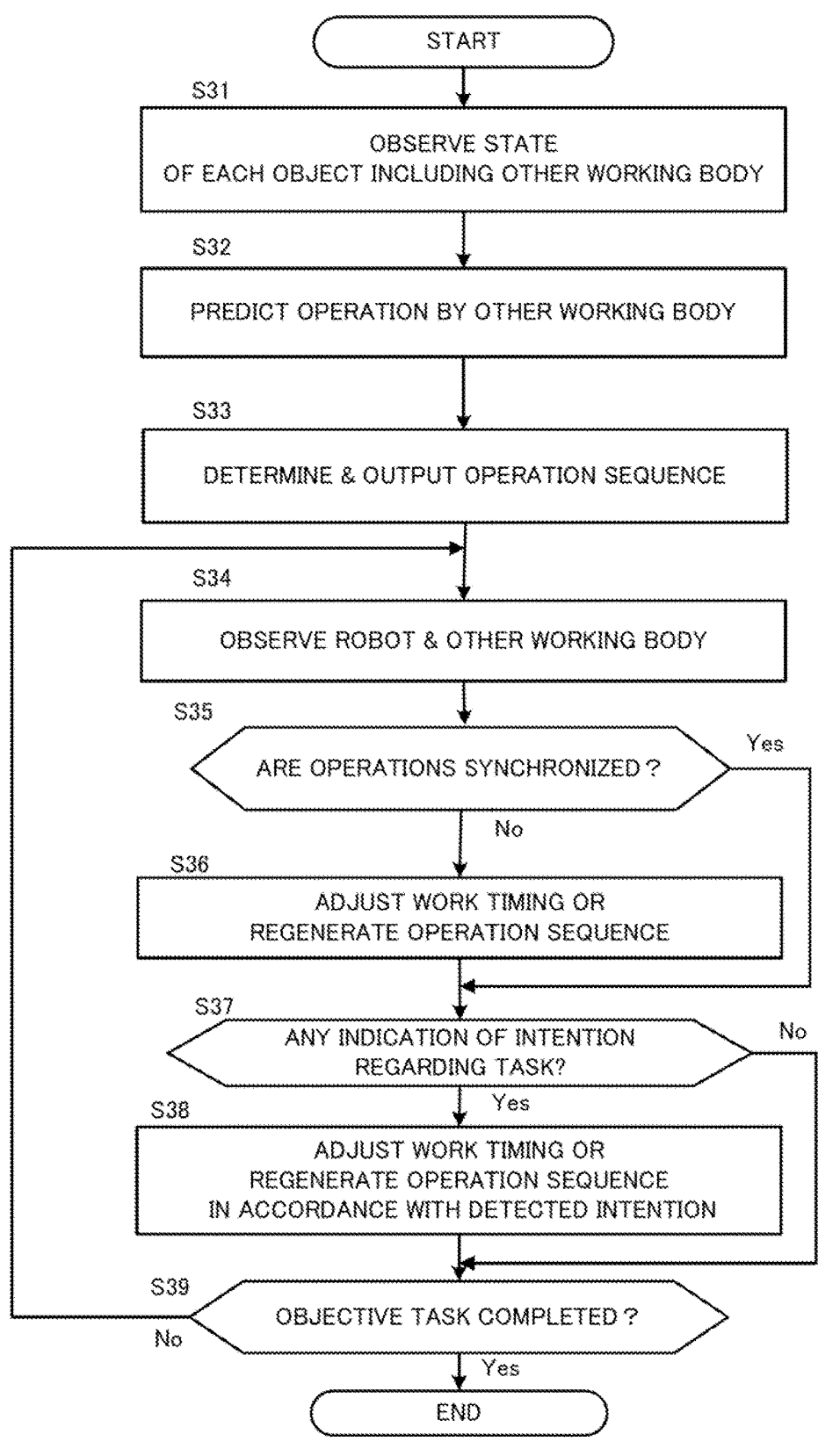
FIG. 12 is an example of a flowchart showing an outline of the robot control process performed by the control device in the third example embodiment.

FIG. 12 is an example of a flowchart showing an outline of the robot control process performed by the control device 1 in the third example embodiment.

First, the observation unit 15 of the control device 1 observes the state of each object present in the workspace including the other working bodies 8 (step S31), and predicts the operation to be executed by the other working bodies 8 (step S32). Next, the operation sequence generation unit 16 determines the subtask sequence Sr which is the operation sequence of the robot 5 and starts the control of the robot 5 according to the subtask sequence Sr (step S33). Thereafter, the observation unit 15 observes the robot 5 and the other working bodies 8 during a time period in which the robot 5 is in operation based on the subtask sequence Sr (step S34). Then, the synchronization management unit 17B determines whether or not the operation executed by the robot 5 and the operation executed by the other working bodies 8 are synchronized (step S35). Then, if the synchronization management unit 17B determines that the operation executed by the robot 5 and the operation executed by the other working bodies 8 are synchronized (step S35; Yes), the process proceeds to step S37. On the other hand, if the synchronization management unit 17B determines that the operation executed by the robot 5 and the operation executed by the other working bodies 8 are not synchronized (step S35; No), it performs adjustment by change of the operation timing of the robot 5 or by the regeneration of the operation sequence (step S36).

Further, during the time period in which the robot 5 is in operation based on the subtask sequence Sr, the intention detection unit 19 determines, based on the output signal S4 outputted by the measurement device 7, whether or not there is an indication of the intention by the worker regarding the task (step S37). Then, when determining that there is an indication of the intention by the worker regarding the task (step S37; Yes), the synchronization management unit 17B performs the adjustment by changing the operation timing of the robot 5 or by generating the operation sequence accordinging to the intention of the worker detected by the intention detection unit 19. The process at step S37 and step S38 and the process at step S34 to step S36 are in no particular order, and the order of these processes may be switched.

Here, a supplementary description will be given of the process at step S38. When the detected intention indicates a change in the work timing of a specific subtask, the synchronization management unit 17B transmits the timing adjustment information Ib for changing the work timing of the specific subtask or the subtask sequence Sr whose timing is adjusted to the robot control unit 18. On the other hand, when the detected intention is an addition of a task to be executed by the robot 5, the synchronization management unit 17B transmits the regeneration instruction information Ia explicitly indicating the task to be additionally executed by the robot 5 to the operation sequence generation unit 16. In this case, the operation sequence generation unit 16 generates a new subtask sequence Sr incorporating one or more subtasks corresponding to the task to be additionally executed by the robot 5. Further, after receiving the new subtask sequence Sr from the operation sequence generation unit 16, the synchronization management unit 17B supplies the new subtask sequence Sr to the robot control unit 18.

Then, the control device 1 determines whether or not the objective task has been completed (step S39), and when determining that the objective task has been completed (step S39; Yes), the control device 1 ends the process of the flowchart. On the other hand, when determining that the objective task has not been completed (step S39; No), the control device 1 goes back to the process at step S34 and the synchronization management unit 17B continues the determination of the synchronization, the adjustment thereof, the detection of the worker's intention, and the adjustment of the operation executed by the robot 5 according to the detected worker's intention.

Thus, according to the third example embodiment, when there is an indication of intention by a worker that is one of the other working bodies 8, the control device 1B can suitably control the robot 5 to perform an operation in which the worker's intention is accurately reflected.

Fourth Example Embodiment

Figure 13:
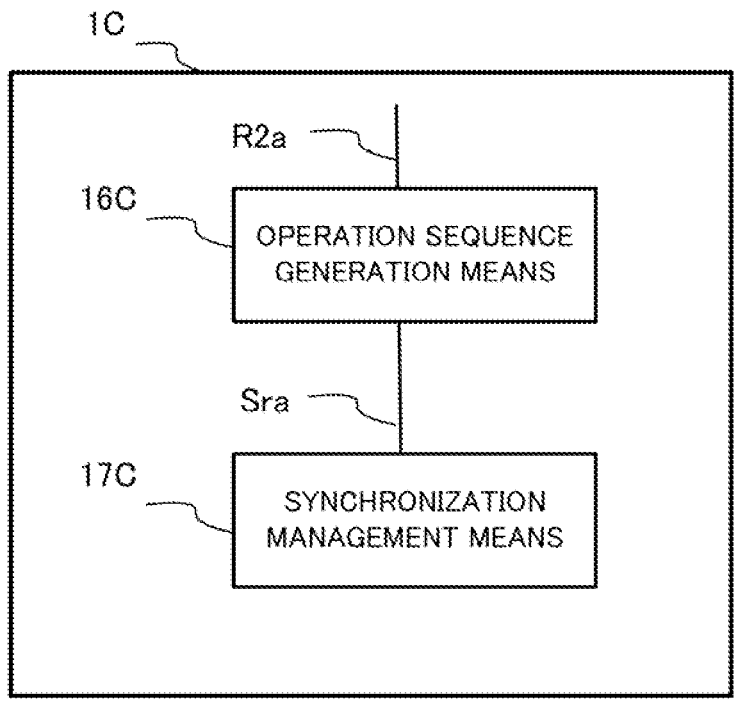
FIG. 13 is an example of a block configuration of the control device in the fourth example embodiment.

FIG. 13 is a schematic configuration diagram of a control device 1C in the fourth example embodiment. As shown in FIG. 13, the control device 1C mainly includes an operation sequence generation means 16C and a synchronization management means 17C.

The operation sequence generation means 16C is configured to generate, based on an operation prediction result "R2*a*" of another working body which performs cooperative work with a robot which executes a task, an operation sequence "Sra" to be executed by the robot. Here, examples of the operation prediction result R2*a* include any of the operation prediction results R2 in the first example embodiment to the third example embodiment. Examples of the operation sequence Sra include any of the subtask sequences Sr in the first example embodiment to third example embodiment. Examples of the operation sequence generation means 16C include the operation sequence generation means 16 according to any of the first example embodiment to the third example embodiment. The control device 1A may be incorporated as a part of the robot or it may be configured separately from the robot.

The synchronization management means 17C is configured to synchronize an operation executed by the robot during execution of the operation sequence Sra and an operation executed by the other working body. Examples of the synchronization management means 17C include the synchronization management unit 17 according to the first example embodiment, the synchronization management unit 17A according to the second example embodiment, and the synchronization management unit 17B according to the third example embodiment. In this case, the synchronization management means 17C may perform the above-described synchronization by controlling the robot, or, by notifying the other working body of information on the operation executed by the robot and thereby urging other working body to perform a synchronization operation with the operation executed by the robot.

Figure 14:
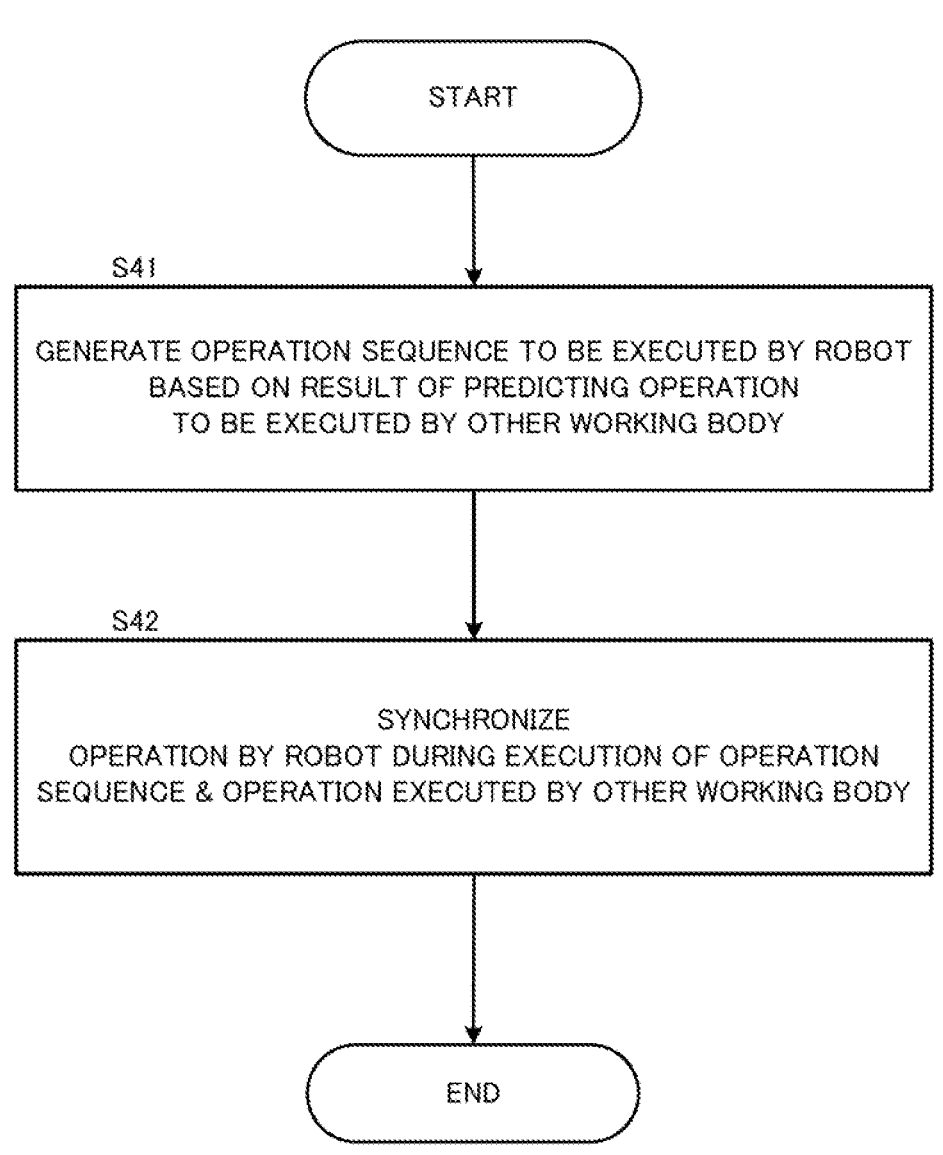
FIG. 14 is an example of a flowchart showing an outline of the robot control process performed by the control device in the fourth example embodiment.

FIG. 14 is an example of a flowchart executed by the control device 1C in the fourth example embodiment. First, the operation sequence generation means 16C is configured to generate, based on an operation prediction result "R2*a*" of another working body which performs cooperative work with a robot which executes a task, an operation sequence "Sra" to be executed by the robot (step S41). Then, the synchronization management means 17C is configured to synchronize an operation executed by the robot during execution of the operation sequence Sra and an operation executed by the other working body (step S42).

According to the configuration in the fourth example embodiment, when the robot performs cooperative work with another working body, the control device 1C can suitably adjust the robot and the other working body to operate in synchronization with each other.

In the example embodiments described above, the program is stored by any type of a non-transitory computer-readable medium (non-transitory computer readable medium) and can be supplied to a processor or the like that is a computer. The non-transitory computer-readable medium include any type of a tangible storage medium. Examples of the non-transitory computer readable medium include a magnetic storage medium (e.g., a flexible disk, a magnetic tape, a hard disk drive), a magnetic-optical storage medium (e.g., a magnetic optical disk), CD-ROM (Read Only Memory), CD-R, CD-R/W, a solid-state memory (e.g., a mask ROM, a PROM (Programmable ROM), an EPROM (Erasable PROM), a flash ROM, a RAM (Random Access Memory)). The program may also be provided to the computer by any type of a transitory computer readable medium. Examples of the transitory computer readable medium include an electrical signal, an optical signal, and an electromagnetic wave. The transitory computer readable medium can provide the program to the computer through a wired channel such as wires and optical fibers or a wireless channel.

The whole or a part of the example embodiments described above can be described as, but not limited to, the following Supplementary Notes.

Supplementary Note 1

A control device comprising:
an operation sequence generation means configured to generate,
  based on an operation prediction result of another working body which performs cooperative work with a robot which executes a task,
  an operation sequence to be executed by the robot; and
a synchronization management means configured to synchronize an operation executed by the robot during execution of the operation sequence and an operation executed by the other working body.

Supplementary Note 2

The control device according to Supplementary Note 1, wherein, in a case that the operation executed by the robot and the operation executed by the other working body are not synchronized, the synchronization management means is configured to adjust an execution timing of an operation included in the operation sequence to be executed by the robot.

Supplementary Note 3

The control device according to Supplementary Note 1, wherein, in a case that the operation executed by the robot and the operation executed by the other working body are not synchronized, the synchronization management means is configured to instruct the operation sequence generation means to regenerate the operation sequence.

Supplementary Note 4

The control device according to Supplementary Note 3, wherein,
  in a case that the task cannot be completed regardless of an adjustment of an execution timing of an operation included in the operation sequence to be executed by the robot, or
  in a case that a completion of the task on an assumption that the regenerated operation sequence is executed is predicted to be earlier than the completion of the task on an assumption that the execution timing of an operation included in the operation sequence to be executed by the robot is adjusted,
  the synchronization management means is configured to cause the robot to execute the regenerated operation sequence.

Supplementary Note 5

The control device according to any one of Supplementary Notes 1 to 4, further comprising
  an observation means configured to predict the operation to be executed by the other moving body based on at least one of
    the output signal from a detection device whose detection range includes a workspace where the task is executed or
    other working body operation related information outputted by the other working body,
  wherein the operation sequence generation means is configured to generate the operation sequence based on a result of predicting the operation to be executed by the other working body, the result being generated by the observation means.

Supplementary Note 6

The control device according to any one of Supplementary Notes 1 to 4,
  wherein the observation means is configured to observe a state of objects in the workspace, and
  wherein the operation sequence generation means is configured to generate the operation sequence based on the operation prediction result and an observation result regarding the state of the objects.

Supplementary Note 7

The control device according to any one of Supplementary Notes 1 to 6,
wherein the synchronization management means is configured to give a notification regarding an operation to be executed by the robot to the other working body that is a worker.

Supplementary Note 8

The control device according to Supplementary Note 7, wherein the synchronization management means is configured to display or output by audio, as the notification, information on a future operation to be executed in a predetermined time by the robot.

Supplementary Note 9

The control device according to Supplementary Note 7, wherein the synchronization management means is configured to give the notification by causing the robot to execute a predetermined gesture.

Supplementary Note 10

The control device according to Supplementary Note 9, wherein the operation sequence generation means is configured to generate the operation sequence including the gesture for giving the notification.

Supplementary Note 11

The control device according to any one of Supplementary Notes 1 to 10, further comprising
an intention detection means configured to detect an intention of the other working body that is a worker,
wherein the synchronization management means is configured, based on the intention, to
instruct the operation sequence generation means to regenerate the operation sequence or
adjust an execution timing of an operation included in the operation sequence to be executed by the robot.

Supplementary Note 12

The control device according to any one of Supplementary Notes 1 to 11,
wherein the operation sequence generation means comprises:
a logical formula conversion means configured to convert an objective task, which is a task to be performed by the robot, into a logical formula based on a temporal logic;
a time step logical formula generation means configured to generate, from the logical formula, a time step logical formula that is a logical formula representing states at each time step for completing the objective task; and
a subtask sequence generation means configured to generate, based on the time step logical formula, the operation sequence that is a sequence of subtasks to be executed by the robot.

Supplementary Note 13

A control method executed by a computer, the control method comprising:
generating,
based on an operation prediction result of another working body which performs cooperative work with a robot which executes a task,
an operation sequence to be executed by the robot; and
synchronizing an operation executed by the robot during execution of the operation sequence and an operation executed by the other working body.

Supplementary Note 14

A storage medium storing a program executed by a computer, the program causing the computer to function as:
an operation sequence generation means configured to generate,
based on an operation prediction result of another working body which performs cooperative work with a robot which executes a task,
an operation sequence to be executed by the robot; and
a synchronization management means configured to synchronize an operation executed by the robot during execution of the operation sequence and an operation executed by the other working body.

While the invention has been particularly shown and described with reference to example embodiments thereof, the invention is not limited to these example embodiments. It will be understood by those of ordinary skilled in the art that various changes in form and details may be made therein without departing from the spirit and scope of the present invention as defined by the claims. In other words, it is needless to say that the present invention includes various modifications that could be made by a person skilled in the art according to the entire disclosure including the scope of the claims, and the technical philosophy. All Patent and Non-Patent Literatures mentioned in this specification are incorporated by reference in its entirety.

DESCRIPTION OF REFERENCE NUMERALS

1, 1A to 1C Control device
2 Task instruction device
3 Robot operation display device
4 Storage device
5 Robot
7 Measurement device
8(8A, 8B) Other working body
41 Application information storage unit
100, 100A Robot control system

What is claimed is:
1. A control device comprising:
at least one non-transitory memory storing instructions; and
at least one processor configured to execute the instructions to:
predict an operation of a working body that performs cooperative work with a robot equipped with robot arms configured to execute a task, based on both of:
an output signal from a detection device provided in a workspace in which the task is executed, and
information output by the working body;
generate, based on the predicted operation, a first subtask sequence of the robot at an execution timing to complete the task;

determine, based on both of the output signal and the information output by the working body task, whether or not one of the robot or the working body cannot start or finish a subtask due to a delay in another subtask of the other one of the robot or the working body;

upon determining that the one of the robot or the working body cannot start or finish the subtask, perform one of modify the execution timing of the first subtask sequence to complete the task or generate a second subtask sequence to complete the task;

predict an end time for completing the task using the second subtask sequence, and an end time for completing the task using the modified first subtask sequence;

based on the predicted end time for completing the task using the second subtask sequence being earlier than the predicted end time for completing the task using the modified first subtask sequence, identify the second subtask sequence as a subtask sequence for controlling the robot;

based on the predicted end time for completing the task using the modified first subtask sequence being earlier than the predicted end time for completing the task using the second subtask sequence, identify the modified first subtask sequence as the subtask sequence for controlling the robot;

output the execution timing of the subtask sequence for controlling the robot and the subtask sequence for controlling the robot; and control the robot to execute the subtask sequence at the execution time.

2. The control device according to claim 1, wherein the at least one processor is configured to execute the instructions to provide a notification regarding the execution time and the subtask sequence, to the other working body that is a worker.

3. The control device according to claim 2, wherein the at least one processor is configured to execute the instructions to provide the notification by causing the robot to execute a predetermined gesture.

4. The control device according to claim 3, wherein the subtask sequence includes the gesture.

5. The control device according to claim 1, wherein the at least one processor is configured to execute the instructions to detect an intention of the other working body that is a worker, and wherein the at least one processor is configured to execute the instructions to perform the one of modify the execution timing or generate the second subtask sequence based on the detected intention.

6. The control device according to claim 1, wherein the at least one processor is configured to execute the instructions to:

convert an objective task to be performed by the robot into a logical formula based on a temporal logic;

generate, from the logical formula, a time step logical formula representing states at each time step for completing the objective task; and generate, based on the time step logical formula, the first subtask sequence.

7. A control method performed by a computer and comprising:

predicting an operation of a working body that performs cooperative work with a robot equipped with robot arms configured to execute a task, based on both of:

an output signal from a detection device provided in a workspace in which the task is executed, and information output by the working body;

generating, based on the predicted operation, a first subtask sequence of the robot at an execution timing to complete the task;

determining, based on both of the output signal and the information output by the working body task, whether or not one of the robot or the working body cannot start or finish a subtask due to a delay in another subtask of the other one of the robot or the working body;

upon determining that the one of the robot or the working cannot start or finish the subtask, performing one of modify the execution timing of the first subtask sequence to complete the task or generate a second subtask sequence to complete the task;

predicting an end time for completing the task using the second subtask sequence, and an end time for completing the task using the modified first subtask sequence;

based on the predicted end time for completing the task using the second subtask sequence being earlier than the predicted end time for completing the task using the modified first subtask sequence, identifying the second subtask sequence as a subtask sequence for controlling the robot;

based on the predicted end time for completing the task using the modified first subtask sequence being earlier than the predicted end time for completing the task using the second subtask sequence, identifying the modified first subtask sequence as the subtask sequence for controlling the robot;

outputting the execution timing of a subtask sequence for controlling the robot and the subtask sequence for controlling the robot; and controlling the robot to execute the subtask sequence at the execution time.

8. A non-transitory computer readable storage medium storing a program executable by a computer to perform processing comprising:

predicting an operation of a working body that performs cooperative work with a robot equipped with robot arms configured to execute a task, based on both of:

an output signal from a detection device provided in a workspace in which the task is executed, and information output by the working body;

generating, based on the predicted operation, a first subtask sequence of the robot at an execution timing to complete the task;

determining, based on both of the output signal and the information output by the working body task, whether or not one of the robot or the working body cannot start or finish a subtask due to a delay in another subtask of the other one of the robot or the working body;

upon determining that the one of the robot or the working cannot start or finish the subtask, performing one of modify the execution timing of the first subtask sequence to complete the task or generate a second subtask sequence to complete the task;

predicting an end time for completing the task using the second subtask sequence, and an end time for completing the task using the modified first subtask sequence;

based on the predicted end time for completing the task using the second subtask sequence being earlier than the predicted end time for completing the task using the modified first subtask sequence, identifying the second subtask sequence as a subtask sequence for controlling the robot;

based on the predicted end time for completing the task using the modified first subtask sequence being earlier than the predicted end time for completing the task using the second subtask sequence, identifying the modified first subtask sequence as the subtask sequence for controlling the robot;

outputting the execution timing of the subtask sequence for controlling the robot and the subtask sequence for controlling the robot; and controlling the robot to execute the subtask sequence at the execution time.

\* \* \* \* \*